(12) United States Patent
Hansell et al.

(10) Patent No.: US 7,386,628 B1
(45) Date of Patent: Jun. 10, 2008

(54) METHODS AND SYSTEMS FOR PROCESSING NETWORK DATA PACKETS

(75) Inventors: Jeffrey Stuart Hansell, Fremont, CA (US); David Gary Roberts, Fremont, CA (US); Mahesh Kumar, Fremont, CA (US); Praveen Ghanashyam Shekokar, Sunnyvale, CA (US); Kalaine Wong, Los Altos, CA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 795 days.

(21) Appl. No.: 10/142,218

(22) Filed: May 8, 2002

(51) Int. Cl.
*G06F 15/173* (2006.01)
*G06F 15/16* (2006.01)

(52) U.S. Cl. ...................... 709/238; 709/236

(58) Field of Classification Search ............ 709/238, 709/245, 227, 223, 226, 201, 230, 232; 711/216; 370/463
See application file for complete search history.

(56) References Cited

U.S. PATENT DOCUMENTS

| | | |
|---|---|---|
| 5,051,987 A | 9/1991 | Conlon |
| 5,481,735 A | 1/1996 | Mortensen et al. |
| 5,526,414 A | 6/1996 | Bédard |
| 5,550,816 A | 8/1996 | Hardwick et al. |
| 5,577,028 A | 11/1996 | Chugo et al. |
| 5,583,862 A | 12/1996 | Callon |
| 5,592,622 A | 1/1997 | Isfeld et al. |
| 5,598,410 A | 1/1997 | Stone |
| 5,636,371 A | 6/1997 | Yu |
| 5,684,800 A | 11/1997 | Dobbins et al. |
| 5,764,736 A | 6/1998 | Shachar et al. |
| 5,781,624 A | 7/1998 | Mitra et al. |
| 5,805,587 A | 9/1998 | Norris et al. |
| 5,809,025 A | 9/1998 | Timbs |
| 5,852,607 A | 12/1998 | Chin |
| 5,917,899 A | 6/1999 | Moss et al. |
| 5,918,074 A | 6/1999 | Wright et al. |
| 6,041,058 A | 3/2000 | Flanders et al. |
| 6,046,979 A | 4/2000 | Bauman |
| 6,047,320 A | 4/2000 | Tezuka et al. |
| 6,047,330 A | 4/2000 | Stracke, Jr. |
| 6,055,618 A | 4/2000 | Thorson |
| 6,069,895 A | 5/2000 | Ayandeh |
| 6,085,238 A | 7/2000 | Yuasa et al. |
| 6,101,181 A | 8/2000 | Passint et al. |
| 6,104,699 A | 8/2000 | Holender et al. |
| 6,104,962 A | 8/2000 | Sastry |
| 6,108,689 A | 8/2000 | Fagen et al. |
| 6,172,990 B1 | 1/2001 | Deb et al. |

(Continued)

OTHER PUBLICATIONS

PCT/US03/11026, International Search Report, Apr. 11, 2003.

(Continued)

*Primary Examiner*—Paul H Kang
(74) *Attorney, Agent, or Firm*—Guerin & Rodriguez, LLP; Michael A. Rodriguez

(57) ABSTRACT

Methods and systems for identifying a local domain for a data packet received at an interface through a network are described herein. In one aspect of the invention, an exemplary method includes extracting the network protocol information from the data packet, determining a local domain ID based on multiple layers of network protocol information simultaneously, and assigning the local domain ID to the data packet. Other methods and systems are also described.

18 Claims, 21 Drawing Sheets

U.S. PATENT DOCUMENTS

| | | | |
|---|---|---|---|
| 6,178,183 | B1 | 1/2001 | Buskirk, Jr. |
| 6,178,453 | B1 | 1/2001 | Mattaway et al. |
| 6,185,213 | B1 | 2/2001 | Katsube et al. |
| 6,212,560 | B1 | 4/2001 | Fairchild |
| 6,377,571 | B1 | 4/2002 | Tai |
| 2001/0037397 | A1 | 11/2001 | Boucher et al. |
| 2001/0049739 | A1* | 12/2001 | Wakayama et al. ......... 709/230 |
| 2002/0069369 | A1 | 6/2002 | Tremain |
| 2002/0156828 | A1* | 10/2002 | Ishizaki et al. ............. 709/201 |
| 2003/0005143 | A1* | 1/2003 | Elzur et al. ................. 709/232 |
| 2007/0086480 | A1* | 4/2007 | Elzur ......................... 370/463 |

OTHER PUBLICATIONS

Inkra Networks, "New Data Center Architecture from Inkra Networks Enables Dedicated Services with Shared Economics," Press Release, Feb. 19, 2002, pp. 1-4, http://www.inkra.com/news_events/press/pr2002-02-19C.html.

Inkra Networks, "Inkra Hardwall: A Technology Overview," Feb. 2002, pp. 1-7, Fremont, CA, USA.

Inkra Networks, "Inkra 4000 Virtual Service Switch Architecture," Jul. 18, 2002, pp. 3-12, Inkra Networks Corp., Fremont, CA, USA.

Inkra Networks, "Service Providers Bullish on Inkra Networks' New Data Center Architecture," Press Release, Feb. 19, 2002, pp. 1-2, http://www.inkra.com/news_events, Inkra Networks Corp., Fremont, CA, USA.

Inkra Networks, "New Data Center Architecture Scales Multi-Tier Enterprise Applications While Slashing Data Center Cost and Complexity" Press Release, Feb. 19, 2002, pp. 1-2, http://www.inkra.com/news_events.

* cited by examiner

*Figure 1D*
*(Prior Art)*

METHODS AND SYSTEMS FOR PROCESSING NETWORK DATA PACKETS

NOTICE OF COPYRIGHT

A portion of the disclosure of this patent document contains material that is subject to copyright protection. The copyright owner has no objection to the facsimile reproduction by anyone of the software engines and modules, as they appears in the Patent and Trademark Office Patent file or records, but otherwise reserves all copyright rights whatsoever.

FIELD OF THE INVENTION

The present invention relates generally to network systems, and more specifically to a method of identifying a network data flow using a virtual local domain identifier.

BACKGROUND OF THE INVENTION

A typical standard networking system implemented single-function, fixed functionality. The first generation of virtualized systems offers per-customer functionality, but the functionality is still fixed. These limitations lead to several drawbacks. Customers may judge service providers based on service availability. Customers may perceive any downtime as a problem with the service provider and may consider switching providers. Service providers want to add service products to their offerings to generate more revenue and increase margins with higher-value offerings. Some of today's systems require downtime associated with upgrades. This is the case because their systems package all functionality into a single runtime image. It is simpler to design and test a system when all functionality is packaged and released in a single unit. In some cases, the service provider has to minimize downtime by building a redundant topology and taking down one system while the backup system handles service. This is non-optimal because it forces the service provider to purchase redundant hardware and design complex configurations. To achieve economies of scale and lower capital expenditures, service providers are installing systems that service multiple customers on a single system. Rather than dedicating hardware to each individual customer, the service provider amortizes that capital expense across many customers, lowering the average cost. These service providers typically schedule downtime with their customers for routine maintenance. This scheduling is more difficult when multiple customers are configured to utilize the same system.

In addition, typical networking systems may offer fixed functionality that is composed in a fixed manner. For instance, processing is usually L2 followed by L3, or SSL acceleration followed by load balancing. Typically, networking systems implement fixed functionality with a monolithic version of software. Those systems that offer Virtual loading typically use a simple link-time configuration strategy or simple Virtual loading at start time, but not thereafter. Thus, you may get to choose what functionality you want to run at startup time, but you cannot change it thereafter. Typically, prior systems have had disadvantages such as they require a reboot when they are upgraded. This causes downtime. As a result, some conventional systems lack the ability to configure functionality in an arbitrary manner using an arbitrary topology, to add new functionality to a running system without causing downtime, or to upgrade a portion of functionality to a new revision.

Furthermore, When identifying a set of packets as a related flow in order to expedite packet handling, a common set of header fields used for transmission control protocol/user datagram protocol (TCP/UDP) flows includes the following: source IP address, destination IP address, source port number, destination port number, and protocol. This set of five fields uniquely identifies a TCP or UDP flow in an IP-based network.

When attempting to use this mechanism on a system that is providing a virtualized set of network components, collisions can occur if the virtualized network components have overlapping IP address spaces. This situation is likely to occur in the presence of Network Address Translation (NAT), which enables private addresses to be used behind network firewalls. If a system provides NAT-capable networking components in a virtualized environment, then the previously described set of five header fields may not uniquely identify a single flow.

A frequently used mechanism for matching a packet to a previously recognized flow of packets is to use a hash of a common set of header fields. In order to match forward and reverse packets for the same session, the hashing algorithm can eliminate the order dependencies between the source and destination header fields (e.g. exclusive OR the fields). Unfortunately, this approach fails to coordinate forward and reverse packets when Network Address Translation (NAT) has been applied because there may not be a correlation between the source and destination header fields for the forward and reverse packets.

One solution to this problem is to match the forward and reverse packets using separate hash tables. The sibling flows (the originating packet direction is considered forward, and the response is reverse) can be tied together using symmetric references. Unfortunately, this scheme requires that a packet be identified as forward or reverse prior to the attempted match, which reduces the flexibility in the configuration of the system (e.g. physical interfaces need to be classified as receiving either forward or reverse packets, but not both).

Therefore, a better solution is highly desirable to be able to compose, manage, change, or upgrade a topology of a network system.

SUMMARY OF THE INVENTION

Methods and systems for identifying a local domain for a data packet received at an interface through a network are described herein. In one aspect of the invention, an exemplary method includes extracting the network protocol information from the data packet, determining a local domain ID based on multiple layers of network protocol information simultaneously, and assigning the local domain ID to the data packet.

In one particular exemplary embodiment, the method includes determining a flow type of the data packet, determining a local domain ID for the data packet using multiple layers of network protocol information simultaneously, selecting a service processing element to process the data packet, based on the flow type and the local domain ID of the data packet, and transmitting the data packet to the selected service processing element.

In a further embodiment, the method includes determining a flow type of the data packet, performing a hash operation on a hash table based on the network protocol information and the flow type, the hash operation being independent of the direction of the data packet, identifying a next flow based on a result of the hash operation, the result of the hash operation indicating the direction of the next flow, and transmitting the data packet to a service processing element corresponding to the next flow.

The present invention includes systems which perform these methods and machine-readable media which, when executed on a data processing system, cause the system to perform these methods. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIGS. 1C and 1D show exemplary TCP/IP network protocols which may be used with the present invention.

DETAILED DESCRIPTION

The following description and drawings are illustrative of the invention and are not to be construed as limiting the invention. Numerous specific details are described to provide a thorough understanding of the present invention. However, in certain instances, well-known or conventional details are not described in order to not unnecessarily obscure the present invention in detail.

Figure 1A:
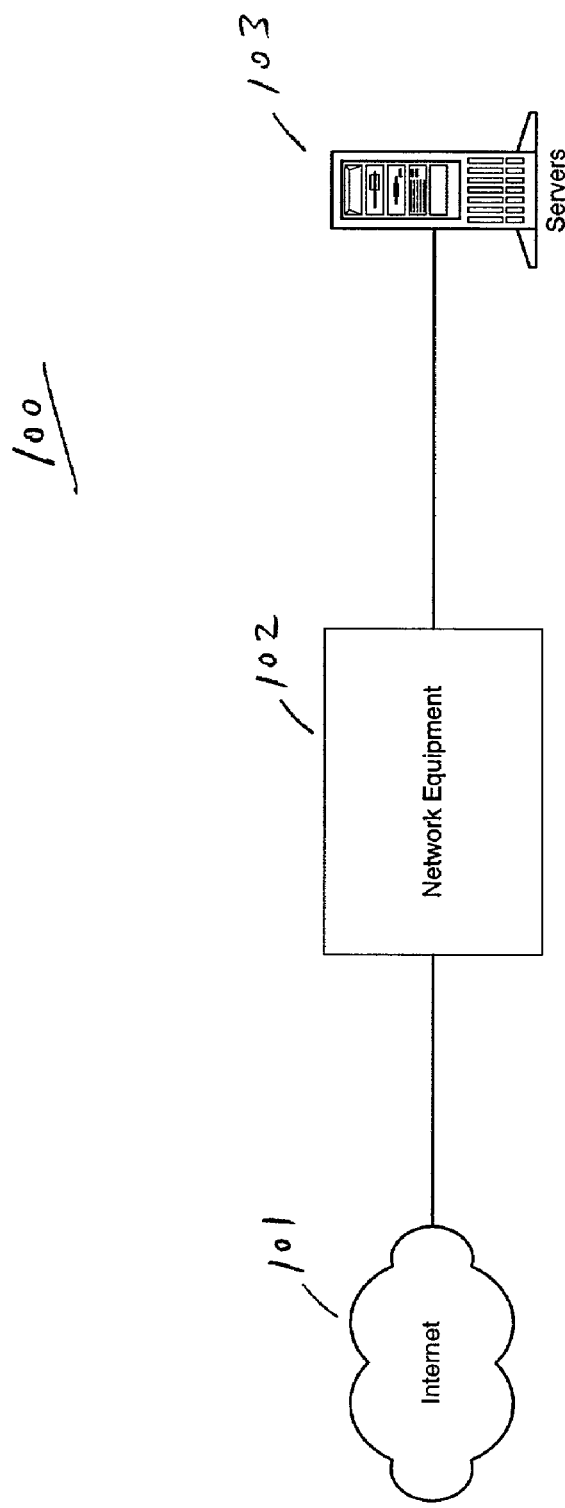
FIG. 1A shows an exemplary block diagram of a network system which may be used with the present invention.

FIG. 1A illustrates a network system which may be used with the present invention. The network system 100 includes an outside network such as Internet 101, network equipment 102, and a plurality of network servers 103. The network equipment 102 receives data packets from another network system over the Internet 101. The data may be received from a client such as a personal computer. Alternatively, the data may be received from another network environment, such as corporate intranet. The data may be packaged in TCP/IP protocol. The network equipment 102 receives the data; the network equipment 102 identifies the source and the destination of the servers being targeted. The network equipment 102 processes the data and distributes the data flow to an appropriate server within the servers 103. In return, one or more servers within the servers 103 process the data packets and respond accordingly. The responses are transmitted from the corresponding servers to the network equipment 102 which will resolve the destination of the client and transmit the data back to the appropriate client over the Internet 101. Multiple servers 103 may share a physical port or IP address; however, each server of the servers 103 may be identified by a corresponding logical ID identified by the network equipment. It is the network equipment's 102 responsibility to resolve these resources which will be described in further details below.

Figure 1B:
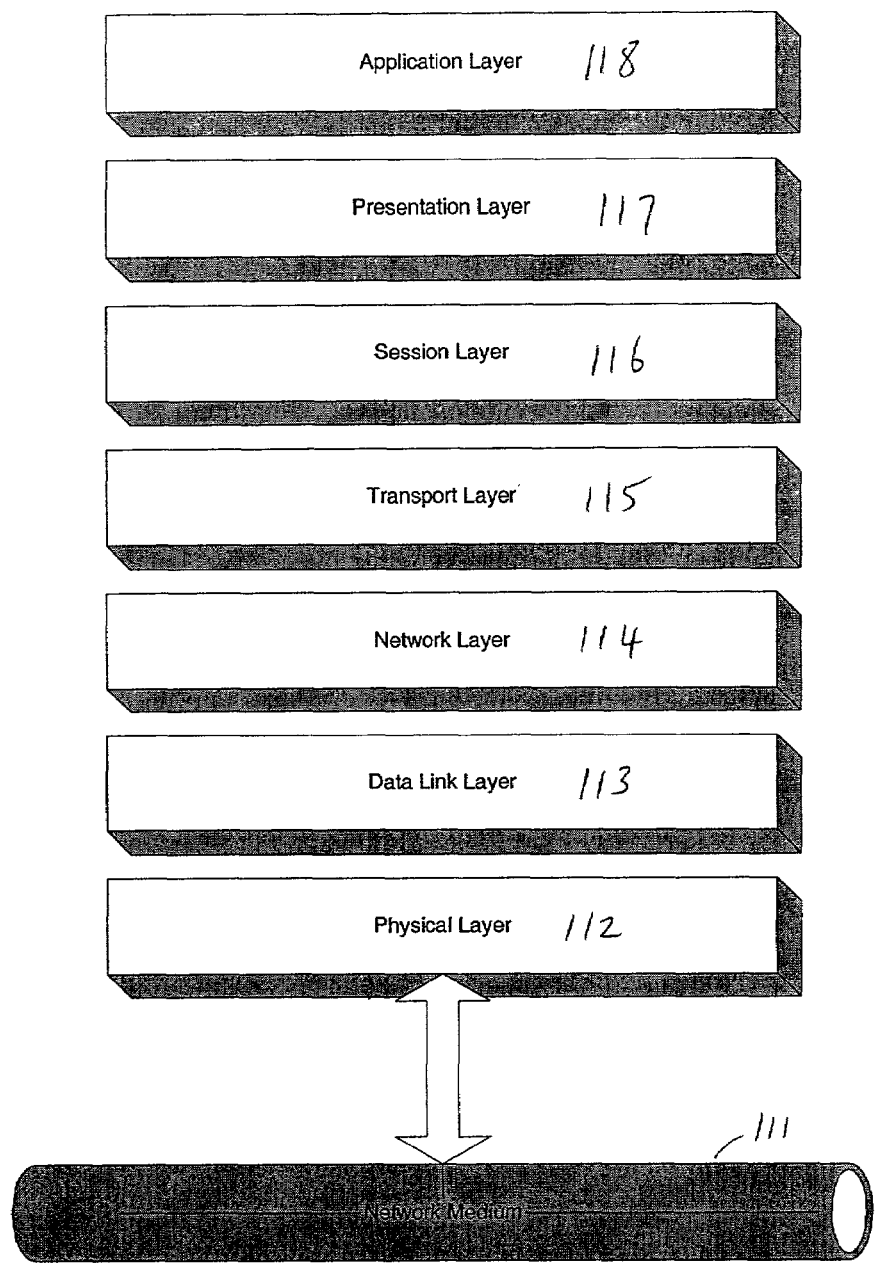
FIG. 1B shows an exemplary network protocol layers which may be used with the present invention.

A typical network architecture usually follows an open system interconnection (OSI) model which comprises seven layers defined by International Organization for Standardization (ISO). FIG. 1B shows a simplified block diagram of network architecture illustrating seven network layers defined by the ISO, which may be used with the present invention. The network architecture 110 includes physical layer 112 coupled to the network medium 111, data link layer 113, network layer 114, transport layer 115, session layer 116, presentation layer 117, and application layer 118.

The application layer, which is also called layer 7, is the OSI layer closest to the user. It differs from the other layers in that it does not provide services to any other OSI layer, but rather to application processes lying outside the scope of the OSI model. Examples of such application processes include spreadsheet programs, word-processing programs, banking terminal programs, and so on. The application layer identifies and establishes the availability of intended communication partners, synchronizes cooperating applications, and establishes agreement on procedures for error recovery and control of data integrity. Also, the application layer determines whether sufficient resources for the intended communication exist.

The presentation layer, which is also called layer 6, ensures that information sent by the application layer of one system will be readable by the application layer of another system. If necessary, the presentation layer translates between multiple data representation formats by using a common data representation format.

The presentation layer concerns itself not only with the format and representation of actual user data, but also with data structures used by programs. Therefore, in addition to actual data format transformation (if necessary), the presentation layer negotiates data transfer syntax for the application layer.

As its name implies, the session layer, which is also called layer 5, establishes, manages, and terminates sessions between applications. Sessions consist of dialogue between two or more presentation entities (recall that the session layer provides its services to the presentation layer). The session layer synchronizes dialogue between presentation layer entities and manages their data exchange. In addition to basic regulation of conversations (sessions), the session layer offers provisions for data expedition, class of service, and exception reporting of session-layer, presentation-layer, and application-layer problems.

The boundary between the session layer and the transport layer can be thought of as the boundary between application-layer protocols and lower-layer protocols. Whereas the application, presentation, and session layers are concerned with application issues, the lower four layers are concerned with data transport issues.

The transport layer, which is also called layer 4, attempts to provide a data transport service that shields the upper layers from transport implementation details. Specifically, issues such as how reliable transport over an inter-network is accomplished are the concern of the transport layer. In providing reliable service, the transport layer provides mechanisms for the establishment, maintenance, and orderly termination of virtual circuits, transport fault detection and recovery, and information flow control (to prevent one system from overrunning another with data).

The network layer, which is also called layer 3, is a complex layer that provides connectivity and path selection between two end systems that may be located on geographically diverse subnetworks. A subnetwork, in this instance, is essentially a single a network cable (sometimes called a segment).

Because a substantial geographic distance and many subnetworks can separate two end systems desiring communication, the network layer is the domain of routing. Routing protocols select optimal paths through the series of interconnected subnetworks. Traditional network-layer protocols then move information along these paths.

The link layer (formally referred to as the data link layer), which is also called layer 2, provides reliable transit of data across a physical link. In so doing, the link layer is concerned with physical (as opposed to network, or logical) addressing, network topology, line discipline (how end systems will use the network link), error notification, ordered delivery of frames, and flow control.

The physical layer, which is also called layer 1, defines the electrical, mechanical, procedural, and functional specifications for activating, maintaining, and deactivating the physical link between end systems. Such characteristics as voltage levels, timing of voltage changes, physical data rates, maximum transmission distances, physical connectors, and other, similar, attributes are defined by physical layer specifications. Further details concerning an OSI model can be found at ISO's Web site at http://www.iso.org.

Figure 1C:
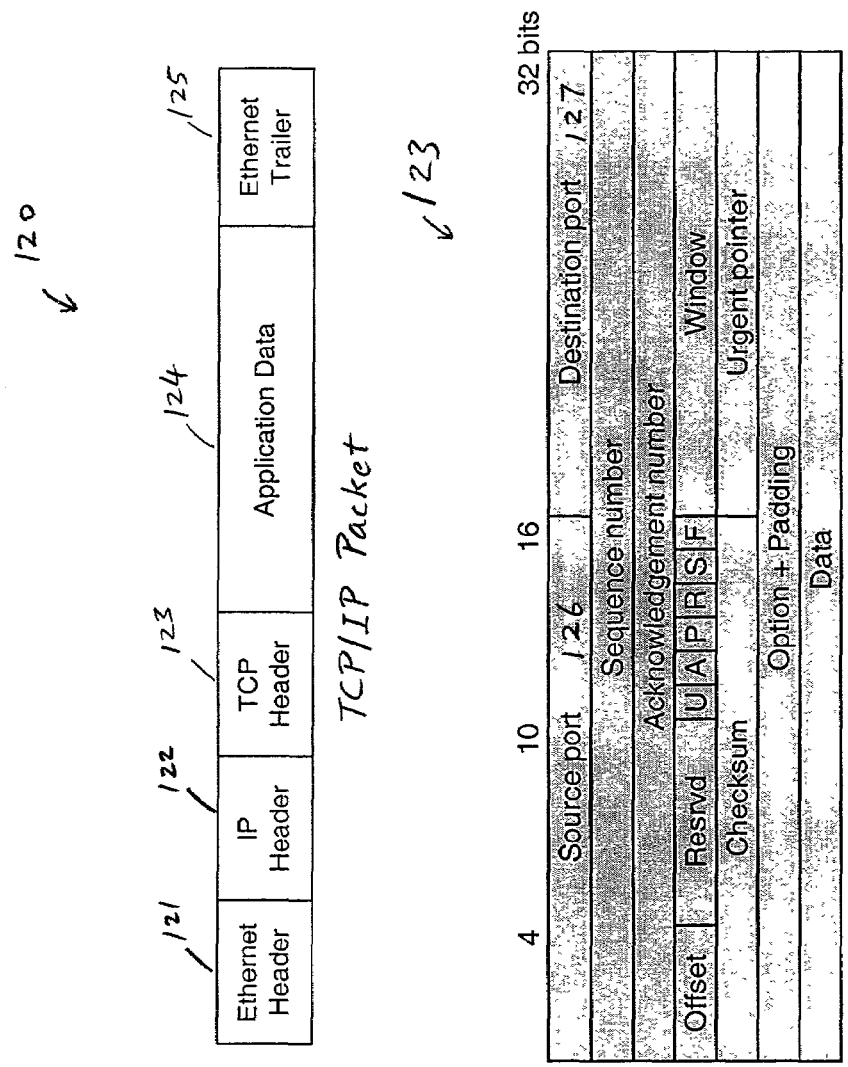
Figure 1D:
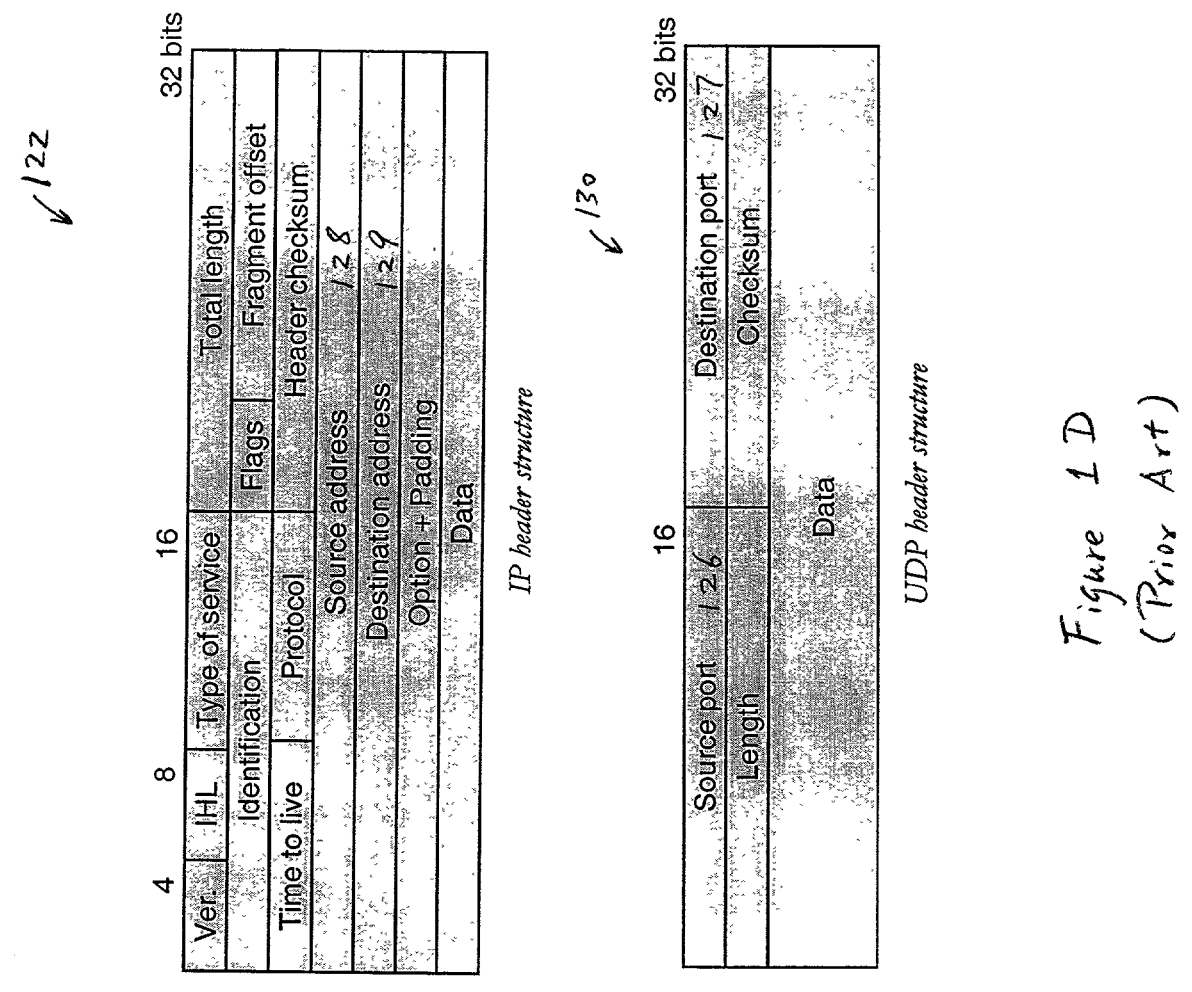

FIGS. 1C and 1D illustrate typical TCP/IP protocol header information which may be used with the present invention. The TCP/IP packet 120 typically includes, among others, an Ethernet header 121, IP header 122, TCP header 123, application data body 124, and Ethernet trailer 125. The TCP header 123 includes, among others, source port 126 and destination port 127. The IP header 122 includes, among others, source IP address 128 and destination IP address 129. Similar to TCP header, the UDP header 130 includes, among others, source port 126 and destination port 127. The Ethernet header 121 normally includes source and destination Ethernet addresses (e.g., media access control (MAC) addresses).

Figure 2:
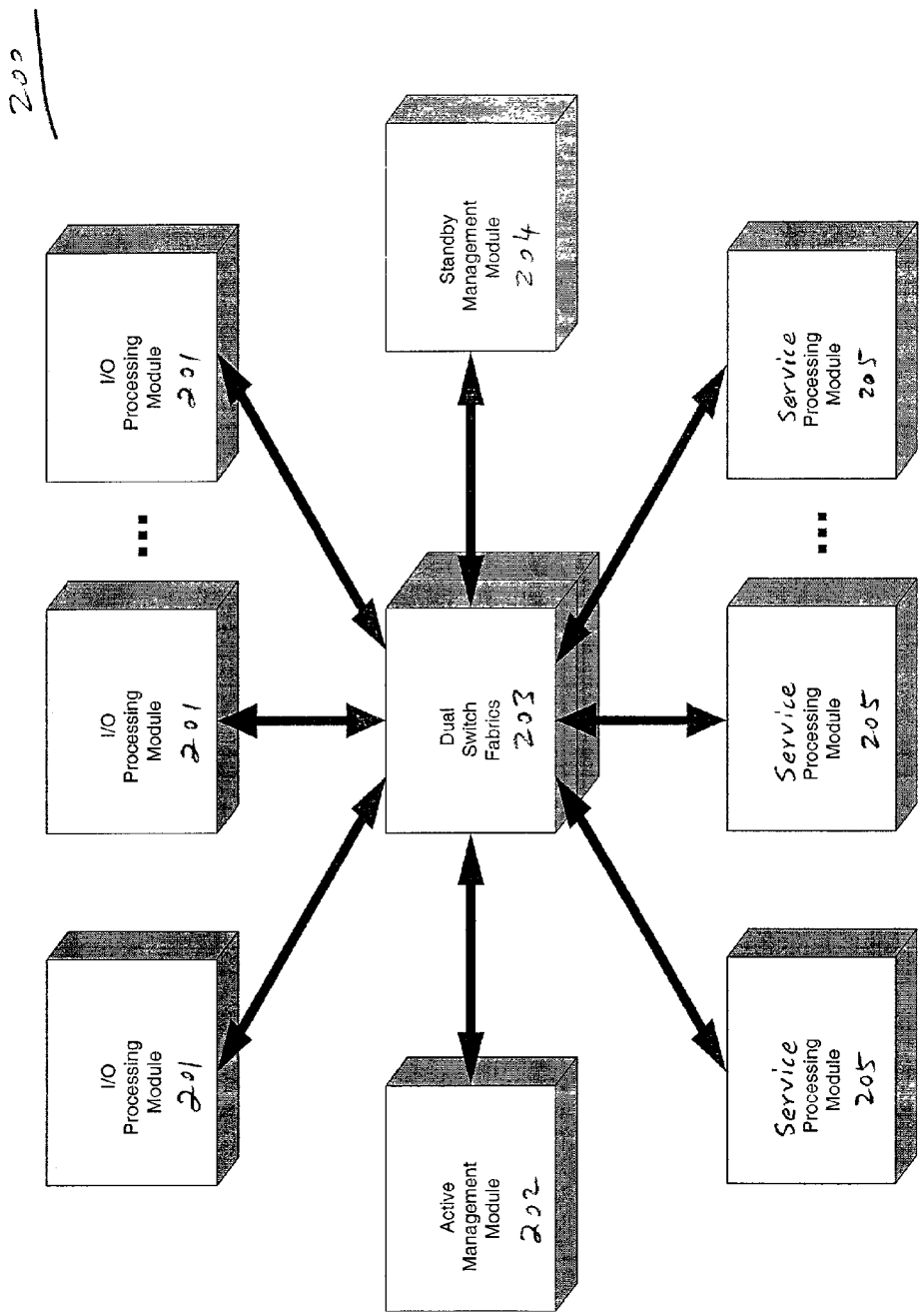
FIG. 2 shows a block diagram of an exemplary architecture of an embodiment of the present invention.

FIG. 2 illustrates an exemplary architecture of one embodiment of the present invention. The system 200 includes input/output (I/O) processing modules 201, management modules 202 and 204, switch fabric module 203, and service processing modules 205. Service processing module (SPM) is also called flow processing module (FPM). When a data flow comes in from an outside network such as Internet 101 of FIG. 1A, the I/O processing module 201 receives the data and classifies all incoming packets for membership in an existing flow. The management module 202 initializes the system, implements the various management interfaces including command line interface (CLI), simple network management protocol (SNMP), Web management, and responds to configuration and reconfiguration requests. The service processing module 205 processes all incoming data and distributes the data to an appropriate server within the servers 103 of FIG. 1A. The standby management module 204 is supplemental to the main management module 202. In the cases that the main management module 202 fails, the standby management module 204 will actively resume all duties of the management functionality. All of the modules are coupled to the switch fabrics 203 which coordinate all of the traffic flows between the modules.

Figure 3:
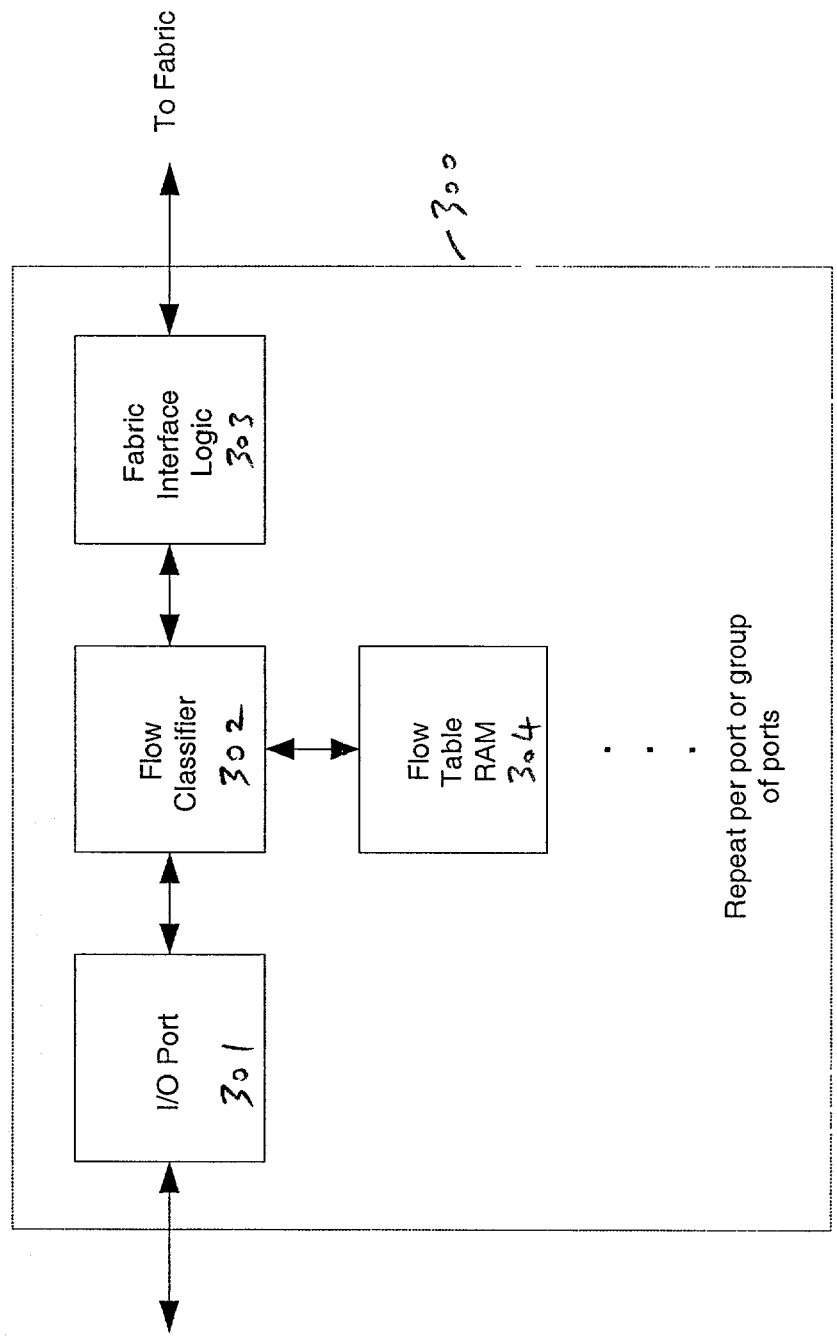
FIG. 3 shows a simplified block diagram of an input/output (I/O) module according to one embodiment of the invention.

FIG. 3 shows an exemplary block diagram of an I/O module according to one embodiment of the invention. The I/O module 300 includes an I/O port 301, a flow classifier 302, a fabric interface logic 303, and a flow table random access memory (RAM) 304. There are several types of I/O modules, each having different port counts, port speeds, and media types. In one embodiment, the I/O modules may be Ethernet variants (e.g., 10/100, gigabit, 10 gigabit, fiber, copper, etc.). The I/O modules may share a basic abstract architecture.

The I/O port 301 represents both the media access control (MAC) and physical (PHY) layers. Typically, this will be a 100 Mbps, 1 Gbps, or 10 Gbps Ethernet MAC/PHY. In the case of 100 Mbps Ethernet ports, there may be a high level of integration of this block, having one chip integrating multiple physical ports. The flow classifier 302 is responsible for mapping incoming packets to the appropriate flow. Depending on the available bandwidth, the flow classifier 302 may serve more than one physical port. The flow classifier 302 may be implemented either by a standard network processor implementing the flow classification algorithm or as an application specific integrated circuit (ASIC).

The I/O module 300 is also responsible parsing the incoming packet in order to determine which SPE should handle the packet. Rather than duplicate this parsing at each SPE, according to one embodiment of the invention, the I/O module 300 creates length fields and a format field that will be sent along with the packet to the SPE. These fields will enable the fast-path, which will be described in further details below, to setup internal buffers with pre-parsed packets without having to replicate all of the I/O module's work. The fabric messages section has tables that show the message header that will be sent between the I/O modules and the service processing modules. In one embodiment, packets that span more than one fabric cell may be required to have a packet trailer.

Once the flow has been identified, a message header will be created to include a local domain ID, also called customer ID uniquely identifying a virtual rack associated with a customer. The message local domain ID will be merged with the packet header, such as TCP/IP packet header 120 of FIG. 1C. In one embodiment, the message local domain ID may be prepended to the packet header. Alternatively, the message local domain ID may be appended to the packet header.

Figure 4A:
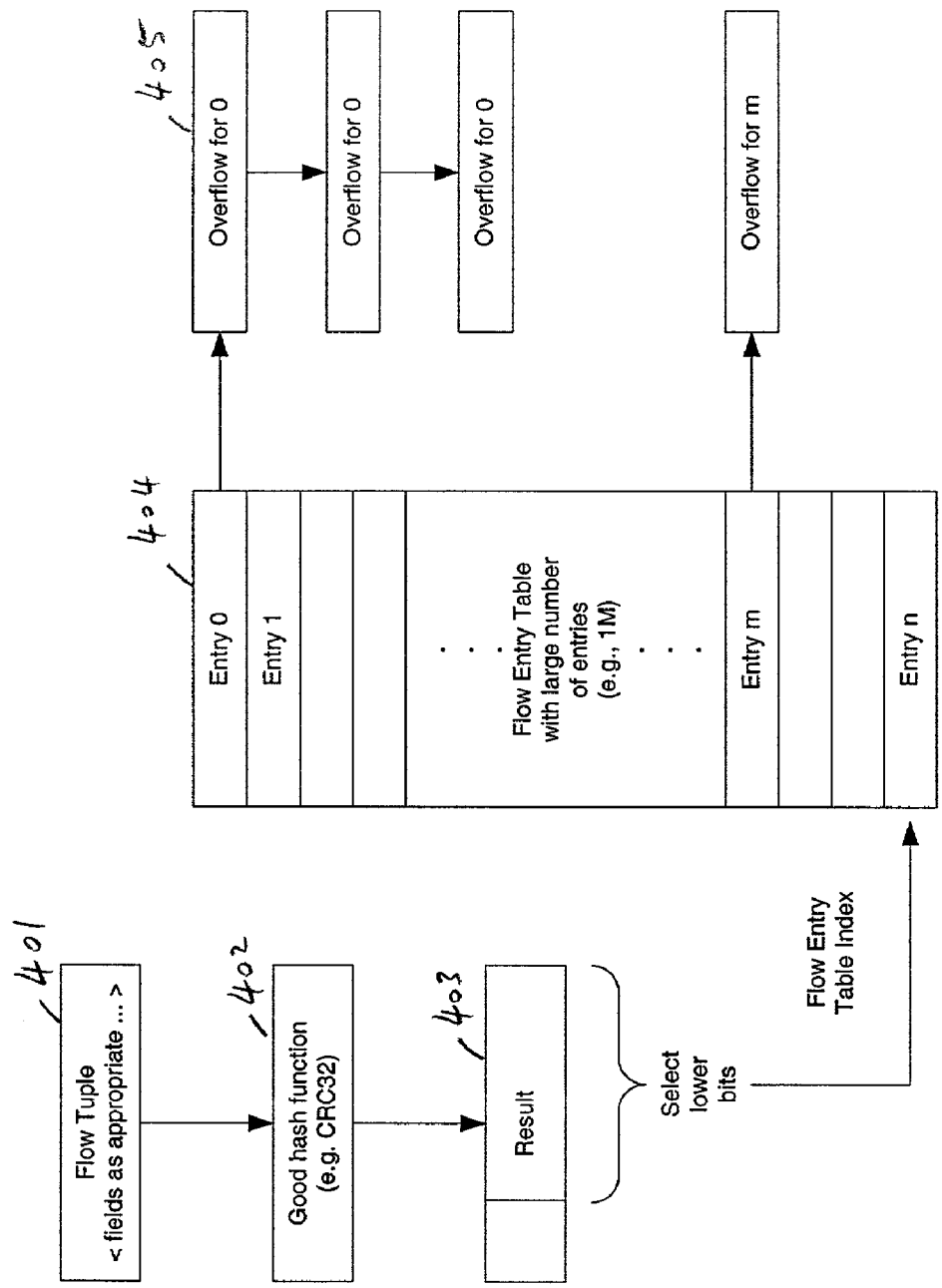
FIG. 4A shows an exemplary flow classifier of one embodiment of the invention.

FIG. 4A illustrates exemplary flow classifier according to one embodiment of the invention. When a packet is received at an interface, the network protocol header information, such as TCP/IP header of FIG. 1C, is extracted and a tuple is created based on the network protocol information. In one embodiment, the system may perform a hash operation through a hash function 402 based on the tuple information. The result of the hash operation 403 will be used to look up in a flow table 404. Once the flow is identified in the flow table, a message header is created and appended to the packet data body and transmitted to the appropriate service processing element (SPE) (e.g., appropriate fabric end point), based on the corresponding flow table entry. If the flow is not identified in the flow table, a SPE selection algorithm may be involved to select the appropriate SPE, which will be described in details further below.

Several different types of flows are defined. In one embodiment, MAC, IP, TCP, and UDP are defined as types of flow. When a packet arrives, the flow classifier, such as flow classifier 302 of FIG. 3, first determines the most specific type of flow of which the packet could be a member. For instance, if a TCP/IP packet arrived at the classifier, the flow type would be TCP, not IP or MAC flow because these are less specific than TCP. If an Appletalk packet arrived at the classifier, the flow type would be MAC because that is the most specific type of flow from those provided (assuming that the classifier does not actually classify Appletalk packets, which could be the case).

The lookup method will use an open-hashing technique. In one embodiment, it is based on a subset of the bits output from running a CRC-32 on the some or all of the fields in the tuple. The SPE selection hash can be used instead of computing a hash on the entire tuple. The seed value used for the CRC-32 hash will be chosen randomly at system initialization, and will be the same for the entire system. In one embodiment, the CRC polynomial is described as: $x^{32}+x^{26}+x^{23}+x^{22}+x^{16}+x^{12}+x^{11}+x^{10}+x^{8}+x^{7}+x^{5}+x^{4}+x^{2}+x+1$.

The result of this search is either success or failure. If success, the classifier creates a message header from the information associated with the table entry. It then concatenates the packet to the message header to create a message, which it sends into the switch fabric to be routed to the appropriate receiver, as specified by the message header. If the search results in a failure, then the flow to which this packet belongs is a new flow, is an existing flow that uses the default SPE selection algorithm, or is an old flow that has begun to arrive at the system on a different port than previous packets. If the classifier cannot determine whether the flow is an old or new flow, the default SPE selection algorithm is used to determine to which SPE the packet should be sent.

When more than a single flow maps to the same entry, the entries are chained using the next entry pointer. Each flow table entry contains a "more bit" that indicates whether it is the last entry in the chain or whether there are additional entries following. Each flow table entry corresponds to one flow of packets, and contains the complete tuple information to make sure that an exact match is made. The flow classifier will examine each entry in the chain (initial entry plus overflow entries if required), comparing the tuple match information from the entry to the tuple information from the frame. When an exact match is found, a message header is created using the information found in the entry, and it is pre-pended to the packet to form a message. That message is then sent to the appropriate SPE specified in the entry.

Figure 4B:
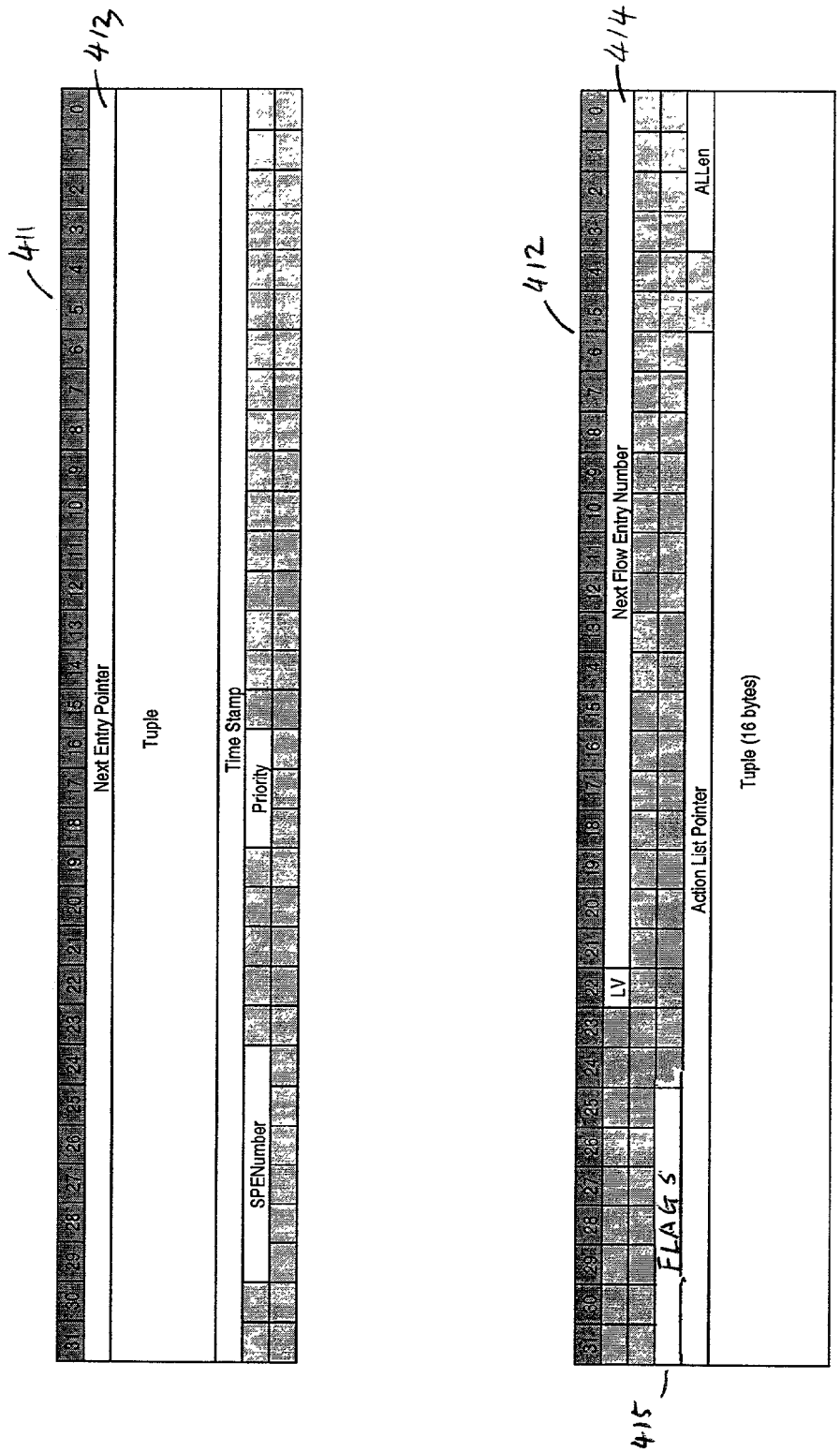
FIG. 4B shows exemplary flow table entries according an embodiment of the invention.

Each I/O module and service processing module (SPM) maintain his or her own flow tables. FIG. 4B illustrates exemplary flow table entries of I/O and SPM modules in accordance with one embodiment of the invention. In this embodiment, the I/O module flow table entry 411 includes a next flow pointer 413 to allow multiple flow entries chained together. Similar to I/O module flow table entry, the SPE flow table entry includes a next flow entry number 414 for the similar purpose. In addition, the SPE flow table entry may include a flag field 415 to store flag bits indicating the status of the corresponding flow.

In one embodiment, the flow table entry of an SPE may be defined as follow:

LV—link valid; next flow entry number field contains a valid reference; if this bit is not set then this entry is the last in the list Next Flow Entry Number—the number of the next flow entry for this list Action List Pointer—the address of the action list for this flow; this field contains the high order 26 bits of the address because the low order six bits of the address will be zero (64 byte aligned)

ALLen—action list length in 64 byte blocks

Tuple—each tuple is built using the fields specified in the tuple table

The forward flows will be 64 byte aligned and the reverse flows will be 32 byte aligned.

Figure 4C:
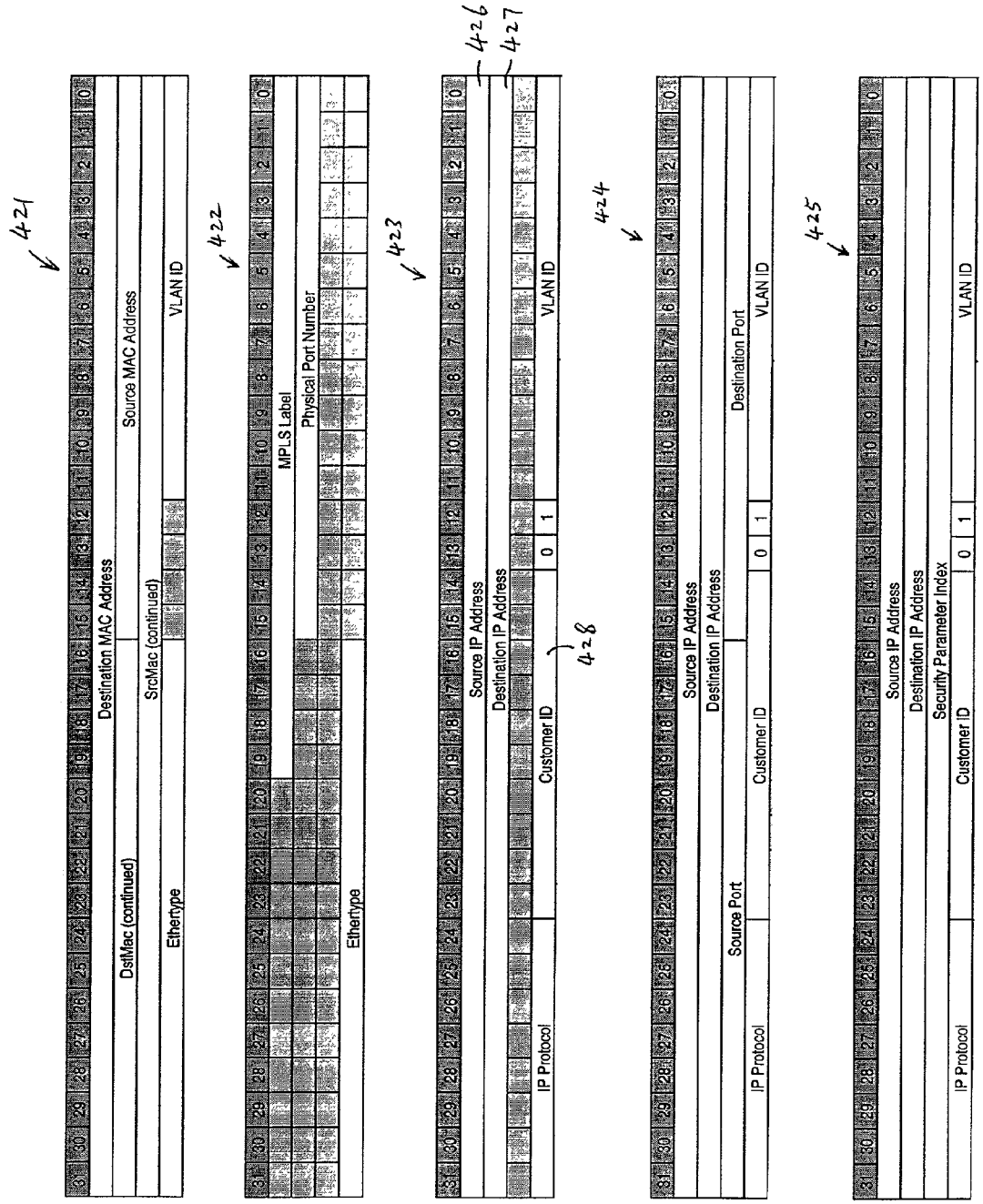
FIG. 4C shows exemplary tuples according to an embodiment of the invention.

FIG. 4C illustrates exemplary tuples for different flow types according to one embodiment of the invention. This embodiment includes a tuple 421 for MAC flows, a tuple 422 for MPLS flows, tuple 423 for IP flows, tuple 424 for TCP/DUP flows, and tuple 425 for encapsulating security payload/authentication header (ESP/AH) flows. Each type of tuple includes some network protocol information which may be used to match (e.g., look up) a corresponding flow in a flow table. For example, IP flow tuple 423 includes source IP address 426 and destination IP address 427. The source and destination IP addresses may be combined with the customer ID 428 to determine the corresponding flow. Similarly, other protocol information, such as VLAN ID, may be used in conjunction with other protocol information simultaneously (e.g., layer 1 to layer 7 of OSI model shown in FIG. 1B).

Figure 5:
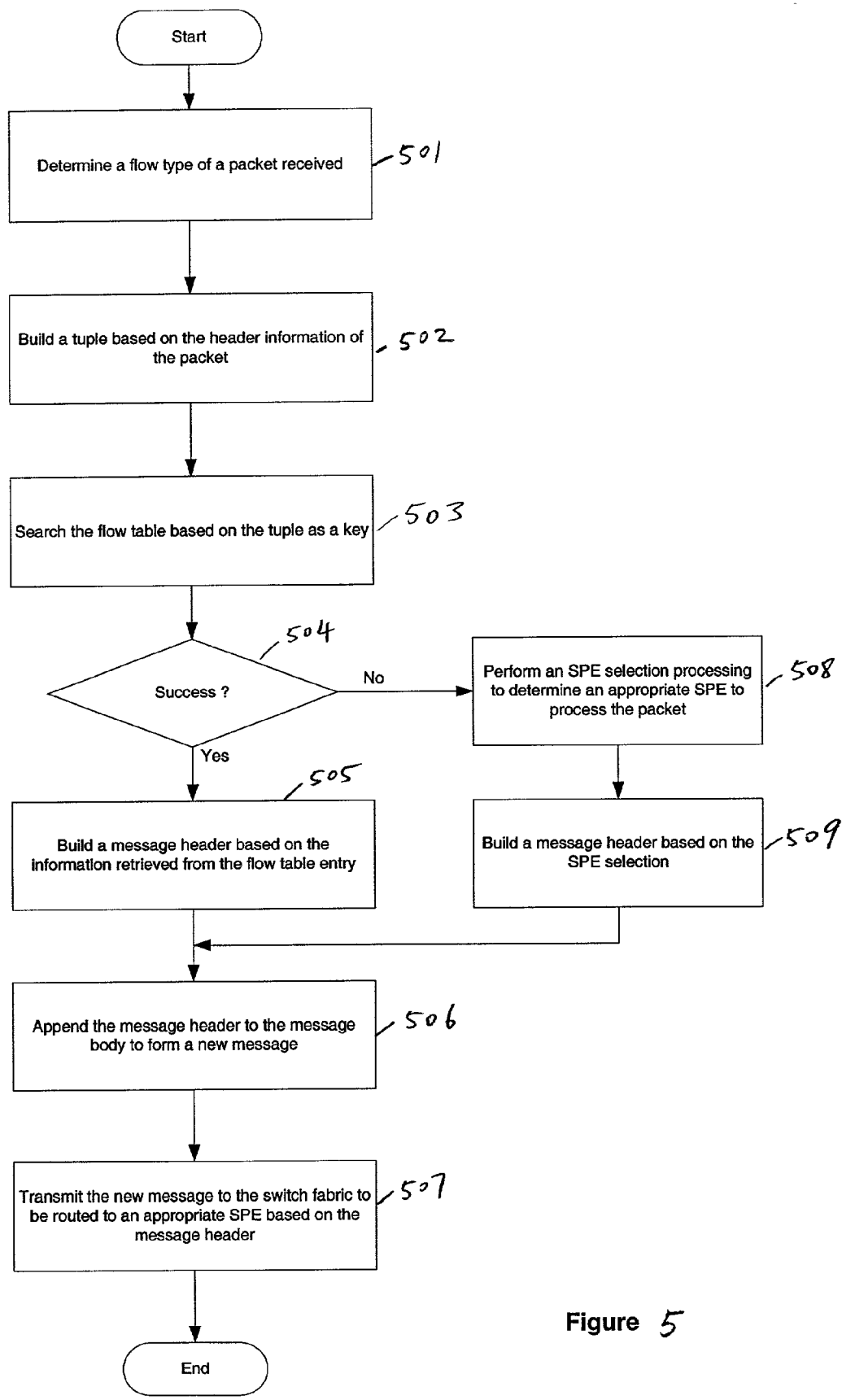
FIG. 5 shows a flowchart illustrating an exemplary method of processing a data packet according to one embodiment of the invention.

FIG. 5 illustrates a flow chart showing an exemplary method of processing a network data packet according to one embodiment of the invention. When a network data packet is received, in one embodiment, at block 501, the system determines the flow type of the packet based on the network protocol header extracted from the packet. At block 502, a tuple is created based on the protocol header. At block 503, the tuple is then used to look up for an identified flow in a flow table, such as flow table 404 of FIG. 4A. At block 504, if the corresponding flow is found in the flow table, at block 505, a message header is created based on the information retrieved from the flow table entry. At block 506, the message header is then appended to the data packet and at block 507, the data packet is transmitted to an appropriate SPE based on the message header.

If the corresponding flow is not identified in the flow table, at block 508, a SPE selection algorithm is involved to select an appropriate SPE, which will be described in further details below. Once the SPE is selected, at block 509, a message header may be constructed accordingly. The message header is then appended to the data packet and transmitted to the appropriate SPE for further processing.

Figure 6:
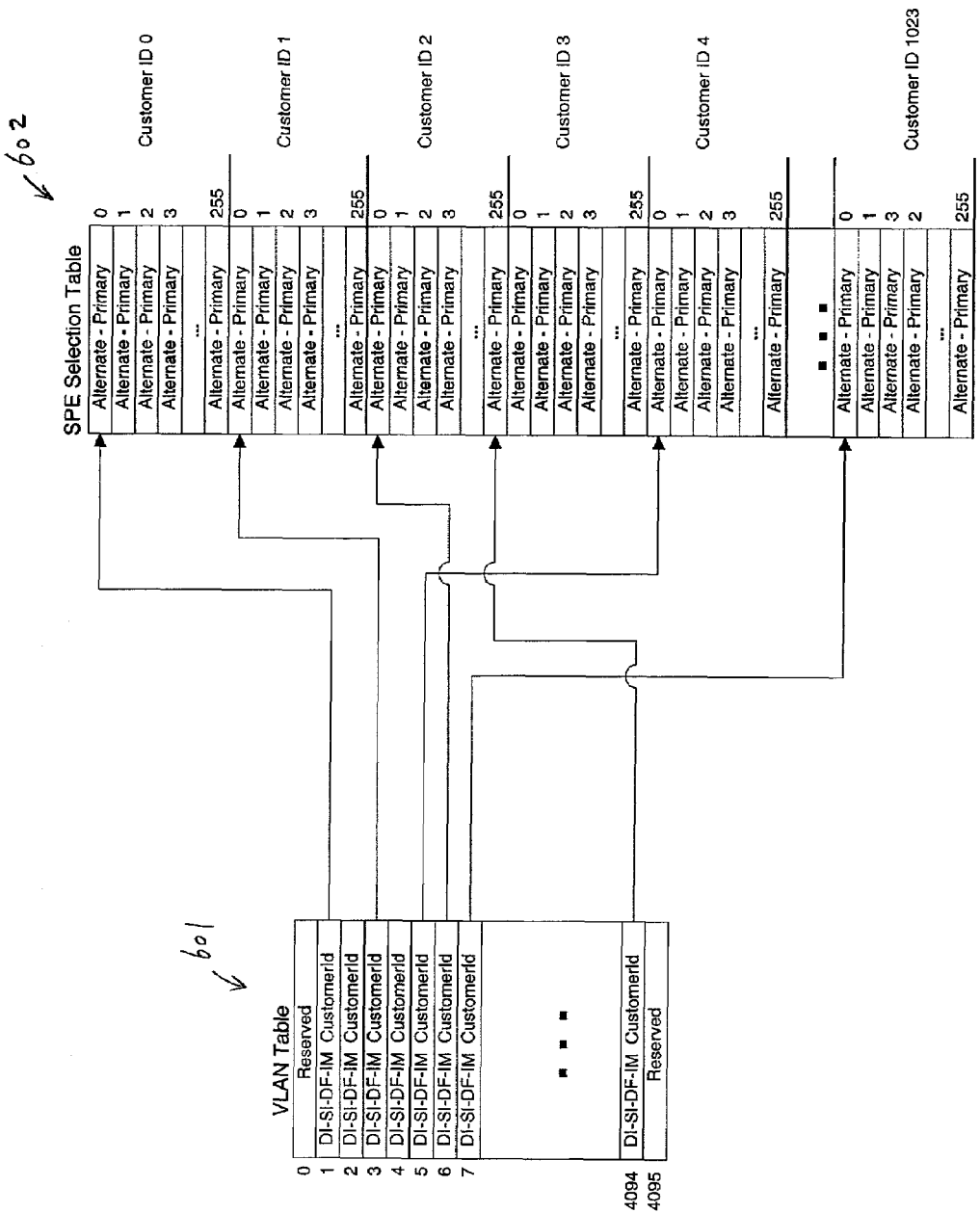
FIG. 6 shows a block diagram illustrating the relationship between the VLAN table and the SPE selection table used to identify a customer ID, according to one embodiment of the invention.

FIG. 6 shows a simplified block diagram of selecting a SPE according to one embodiment of the invention. In this embodiment, a system-wide VLAN table is maintained to store a unique customer ID (e.g., local domain ID) uniquely identifying a local domain such as a virtual rack. In one embodiment, the VLAN table contains system-wide 4K-entries, which are used to determine the customer ID. When a SPE selection algorithm is involved, the system looks up the VLAN table 601 for the corresponding VLAN port to determine the corresponding customer ID. The VLAN table is indexed by the VLAN ID. Each VLAN table entry includes a customer field storing the customer ID. Once the customer ID is found in the VLAN table 601, a hash operation is performed based on the customer ID. The result of the hash operation is then used to look up for an appropriate SPE in a SPE selection table 602. In one embodiment, the SPE selection table 602 includes alternate SPE fabric endpoint and primary SPE fabric endpoint (not shown). The data packet is then transmitted to the appropriate SPE fabric endpoint for processing.

Figure 7:
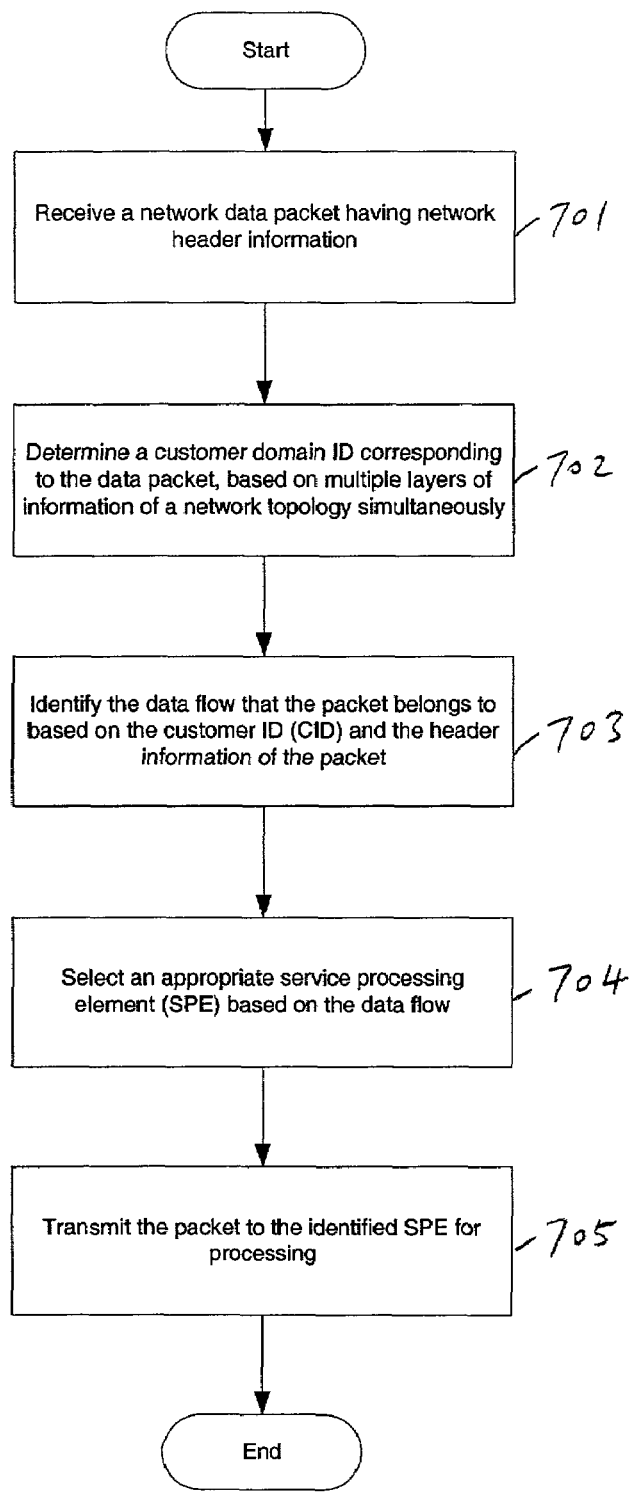
FIG. 7 shows a flowchart illustrating an exemplary method of processing a data packet according to an alternative embodiment of the invention.

However, if the customer ID is not determined through the VLAN table, the system will involve a process to determine and assign a customer ID to the data packet before distributing it to a flow. FIG. 7 shows a flowchart illustrating an exemplary method for processing a data packet. In one embodiment, at block 701, when a packet received, the network protocol information is extracted from the data packet header. At block 702, the system determines a customer ID (e.g., local domain ID) corresponding to the data packet. The customer ID is determined based on multiple layers of network protocol information, such as seven layers of OSI model of FIG. 1B. The determination of a customer ID is determined based on these seven layers of network protocol information simultaneously. At block 703, once the customer ID is assigned, the system identifies a flow to which the data packet belongs based on the newly assigned customer ID, as well as the network protocol information extracted from the data packet header. At block 704, an appropriate SPE is then selected based on the flow and the data packet is then transmitted to the appropriate SPE for processing, at block 705.

Figure 8A:
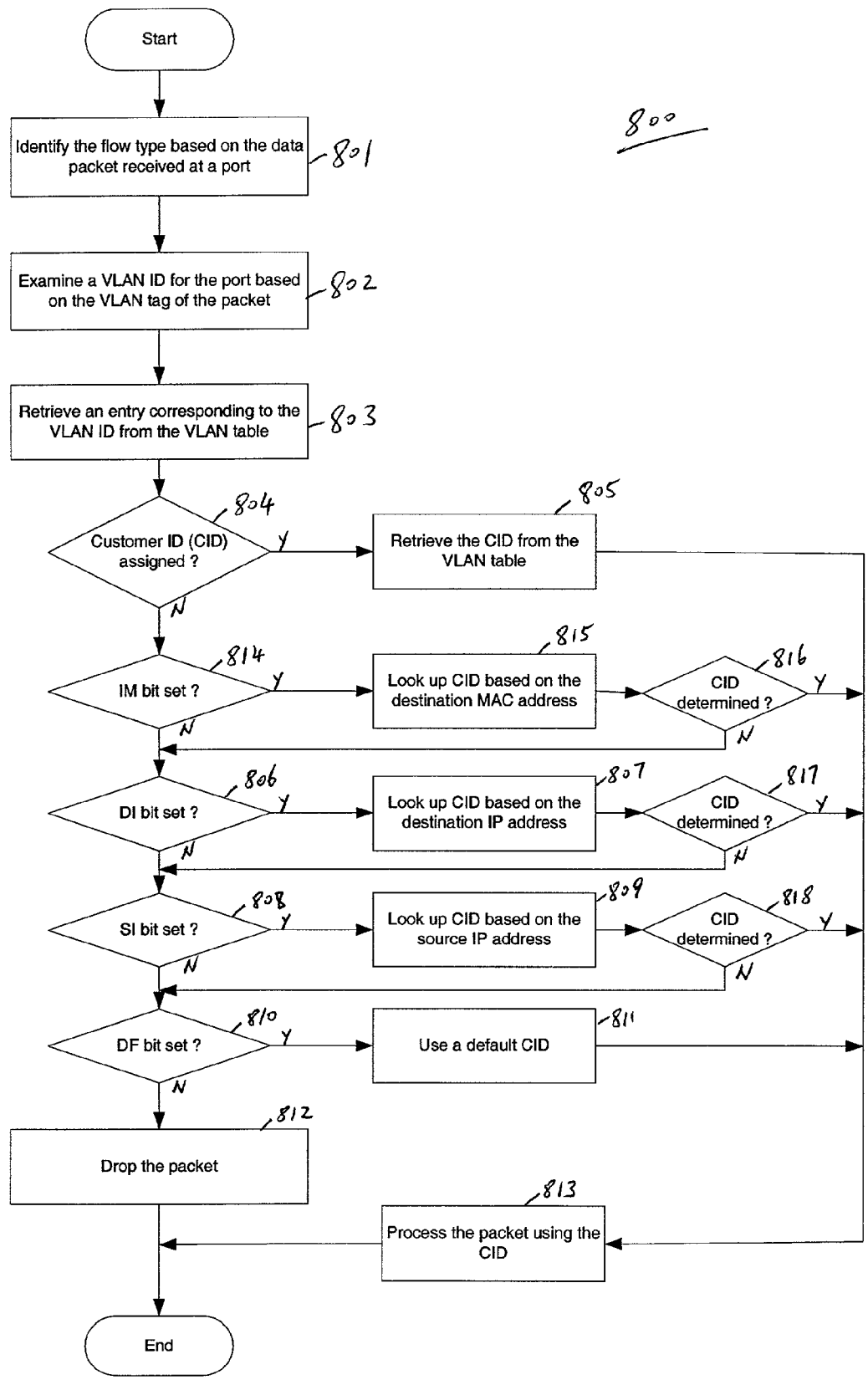
FIG. 8A shows a flowchart illustrating an exemplary method of determining a customer ID for a data packet according to one embodiment of the invention.

FIG. 8A shows flowchart illustrating an exemplary method for determining a customer ID according to one embodiment of the invention. In one embodiment, the method includes extracting the network protocol information from the data packet, determining a local domain ID based on multiple layers of network protocol information simultaneously, and assigning the local domain ID to the data packet. The local domain ID is also called customer ID. In one embodiment, the customer ID is determined based on port information, a virtual local area network (VLAN) ID, a destination internet protocol (IP) address, a source IP address, and a media access control (MAC) address.

According to one embodiment of the invention, the system uses a 10-bit customer ID (CID) to enable resource allocation and tracking per customer. Each customer is assigned exactly one customer ID. By assigning a customer ID to each packet prior to the flow lookup, the customer ID can be part of the tuple used to match a flow. This allows overlapping private IP addresses among multiple content providers to share the same I/O module. The following table lists the various methods of determining the customer ID for each packet. In one embodiment, the method of identifying a CID may be summarized as follow:

| Interface Configuration | Method for Assigning Customer ID |
| --- | --- |
| Interface is dedicated to one customer | All packets are assigned the same customer ID for that interface |
| Each VLAN on an interface is dedicated to one customer | Each packet is assigned a customer ID based on the interface and VLAN ID |
| Interface is shared by customers for external routing (e.g. WAN ports) | Each packet is assigned a customer ID based on the destination IP address |
| Interface is shared by customers for internal routing (e.g. server ports) | Each packet is assigned a customer ID based on the source IP address |
| VLAN is shared by customers for layer 2 and layer 3 switching | Each packet is assigned a customer ID based on the destination MAC address; if destination MAC address does not uniquely identify customer ID, then external/internal routing method is used |
| One or more VLANs are shared by customers for external routing with other VLANs dedicated to other customers | Dedicated VLANs: Each packet is assigned a customer ID based on the VLAN tag and interface. Shared VLANs: Each packet is assigned a customer ID based on the destination IP address |
| One or more VLANs are shared by customers for internal routing with other VLANs dedicated to other customers | Dedicated VLANs: Each packet is assigned a customer ID based on the VLAN tag and interface. Shared VLANs: Each packet is assigned a customer ID based on the source IP address |

In addition, according to one embodiment of the invention, a system-wide VLAN Table is used to identify the Customer ID that should be given to packets that are received on each VLAN. The entries in the VLAN table are indexed by the VLAN ID. In one embodiment, the VLAN table entry may be described as VLAN table entry 601 of FIG. 6.

The customer ID field in the VLAN table entry is used if it is non-zero. If the customer ID field is zero, then the method for obtaining the customer ID will be determined by looking at the DI/SI/DF/IM bits. If the MAC (IM) bit is set, a lookup using the MAC address of the packet is attempted. If the customer ID is not resolved, the destination IP (DI) bit is checked. If the destination IP (DI) bit is set, then a lookup using the destination IP address of the packet is attempted. If the customer ID is not resolved, then the source IP (SI) bit is checked, which determines if a lookup should be performed using the source IP address. The default (DF) bit determines if the default customer ID (1) should be used for packets that are not able to determine a customer ID. If the customer ID is not determined, and the DF bit is not set, then the packet should be dropped.

Referring to FIG. 8A, when the system determines a customer ID (CID) for a data packet received at a port, at block 801, a flow type is determined based on the network protocol header of the data packet. At block 802, the system examines the corresponding VLAN ID for the port based on the VLAN ID tagged with the packet. At block 803, the system looks up a VLAN table based on the VLAN ID and retrieves the corresponding VLAN entry, such as VLAN entry 601 of FIG. 6. At block 804, the customer ID retrieved from the VLAN entry is checked whether the customer ID is available. If the customer ID is available (e.g., non-zero value), the customer ID is used at block 805 for further processing at block 813. If the customer ID is not valid (e.g., zero value), the IM bit of the VLAN entry is checked, at block 814. If the IM bit is set, at block 815, a customer ID is determined based on the destination MAC address. If the IM bit is not set, or the lookup of CID based on the destination MAC address fails at block 816, the DI bit of the VLAN entry is checked, at block 806. If the DI bit is set, at block 807, a customer ID is determined based on the destination IP address through a look up operation. If the DI bit is not set, or the lookup of CID based on destination ID address fails at block 817, the SI bit will be examined at block 808. If the SI bit is set, at block 809, a customer ID is determined based on the source IP address through a look up operation. If the SI bit is not set, or the lookup of CID based on source IP address fails at block 818, the DF bit is checked at block 810. If the DF bit is set, at block 811, a default customer ID (e.g., customer ID of 1) is used. If the customer can be identified, further processing, such as SPE selection processing, will be performed at block 813. Otherwise, the packet will be dropped at block 812.

Figure 8B:
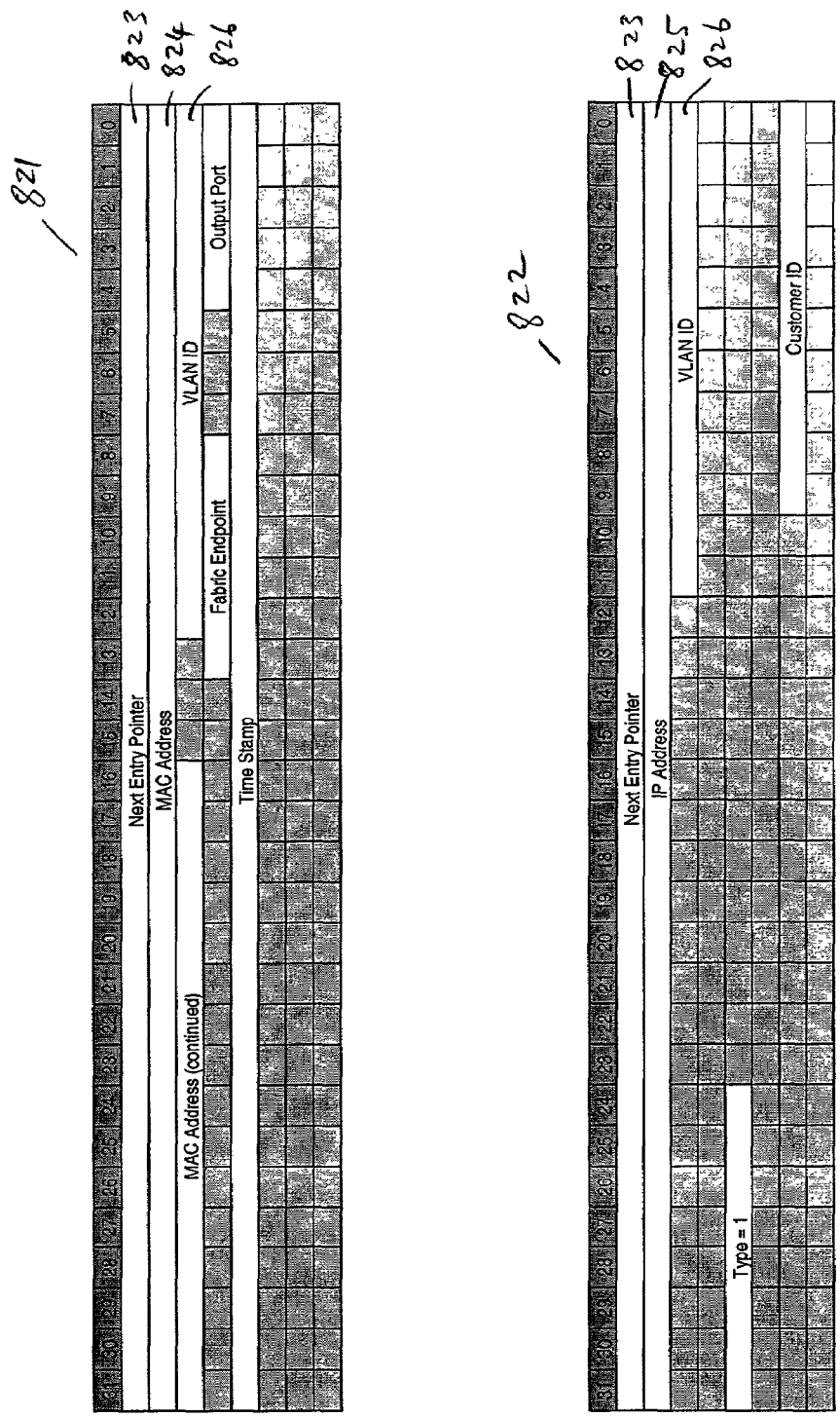
FIG. 8B shows exemplary addresses lookup according to one embodiment of the invention.

FIG. 8B shows an exemplary MAC address look up and IP address look up entries, according to one embodiment of the invention. Each look up entry includes a next entry pointer 823 to allow multiple entries chained together. The MAC address look up entry 821 includes MAC address 824 and VLAN ID 826. Similarly, the IP address look up entry 822 includes IP address 825 and VLAN ID 826.

When a service processing module (SPM) is inserted, the chassis manager notifies the system that a new SPM has been inserted. If the new SPM is a replacement or has been inserted into a slot that has been pre-assigned by the management system, then the new SPEs will be automatically assigned to the proper SPE set. Otherwise, the SPEs will not be assigned to SPE sets. When the SPE is added to a SPE sets, the system will gradually migrate a portion of the flows from the existing SPMs to the new SPM. This migration will use a bit (e.g., the SA bit), in the message header sent by the IOE to the SPE.

Next, a new version of the SPE selection table, such as table 602 of FIG. 6, is rebuilt with the new SPE added to the sets. For each insertion event, the framework compares the new SPE selection table with the old one, and sends relinquish message(s) to each SPE for its locations in the SPE selection table that will be given to the new SPE. Each relinquishing SPE sends SPE selection table updates to all of the I/O modules. The updates set the alternate SPE field in each entry that will be relinquished, but leave the primary SPE field unchanged. IO module sets the SA bit in the message header if an entry with non-zero alternate SPE 607 and sends it to the primary SPE.

When a general processor computer (e.g., PowerPC), which is described in details further below, processes a message that has the new flow bit set and the SA bit set, then the general processor computer (GPC) creates a short action list that forwards all messages for that flow to the new SPE (i.e. the Alternate SPE from the message header) and the GPC forwards the original message to the new SPE. After a period of time, the SPEs that have been asked to relinquish entries in the SPE selection table should check for long-lived flows that will be affected by the SPE selection table change. Each SPE should program the I/O modules to override the SPE selection table and continue sending packets from those flows to the same SPE.

When an SPE has completed programming the long-lived flows, it sends a message to all I/O modules to change the SPE selection table, such as table 602 of FIG. 6. The primary SPE 608 is replaced by alternative SPE 607 after the relinquishment is complete. The alternative SPE 607 is set to zero. Each SPE may send a message to the management module when it has completed the relinquishment of the selection table entries.

When the system is given notice of a planned SPM removal, the system will transfer new flow setup requests from the target SPM to the other SPMs. This migration will use the SA bit in the message header sent by the IOE to the SPE. If the GPC on the target SPM receives a message with the SA bit set, and the message is a new flow request (i.e. tuple lookup failed on the hardware accelerator ASIC), then it should forward the message to another SPE and create a brief action list for that flow that merely forwards the message to the new SPE.

A system administrator (or other person) notifies the system that an SPM will be removed. A new version of the SPE selection table is rebuilt with the new SPE sets. For each removal event, the framework compares the new SPE selection table with the old, and sends relinquish message(s) to each SPE removed from the SPE set with a list of locations in the SPE selection table that will be given to another SPE. Each target SPE sends SPE selection table updates to all of the I/O modules. The updates set the alternate SPE field in each entry that will be relinquished, but leave the primary SPE field unchanged.

Figure 9A:
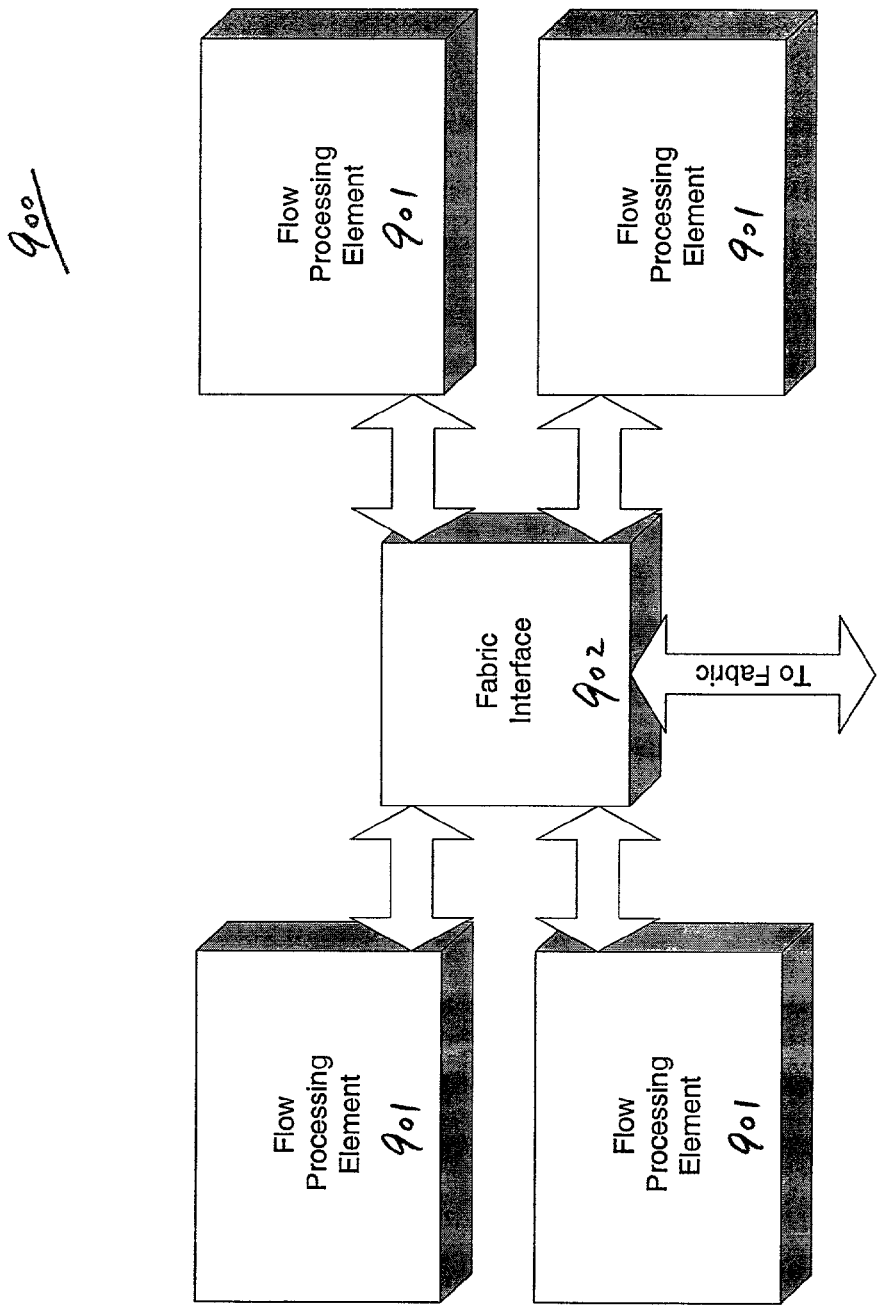
FIG. 9A shows a block diagram of an exemplary service processing module according to one embodiment of the invention.

FIG. 9A shows an exemplary block diagram of a service processing module (SPM), according to one embodiment of the invention. The SPM implements the packet processing for the system. Referring to FIG. 9A, an SPM contains one or more Service Processing Elements (SPE) 901. All of the SPEs are coupled through the fabric interface 902 to the fabric switches (not shown), which may be connected to other components of the system. Each SPE may consist of a general processor computer, such as a PowerPC, a hardware acceleration device, such as ASIC, and an optional cryptographic acceleration device. The packet processing is divided into two main categories: fast-path which is implemented through the hardware acceleration device, and slow-path which is implemented through the general processor computer, such as PowerPC, or alternatively through a combination of the hardware acceleration device and the general processor computer.

The fast-path for packet processing is designed to be simple and fast, and packets in recognized flows that require simple processing should be handled without using the general processor computer (e.g., PowerPC). For slow-path packets, the hardware acceleration device (e.g., the ASIC) can assist the general processor computer (GPC) by performing packet parsing and other low-level primitives for most packets. The packet headers and data will be placed in the GPC's memory. IML messages will be placed in the GPC memory without being modified.

Figure 9B:
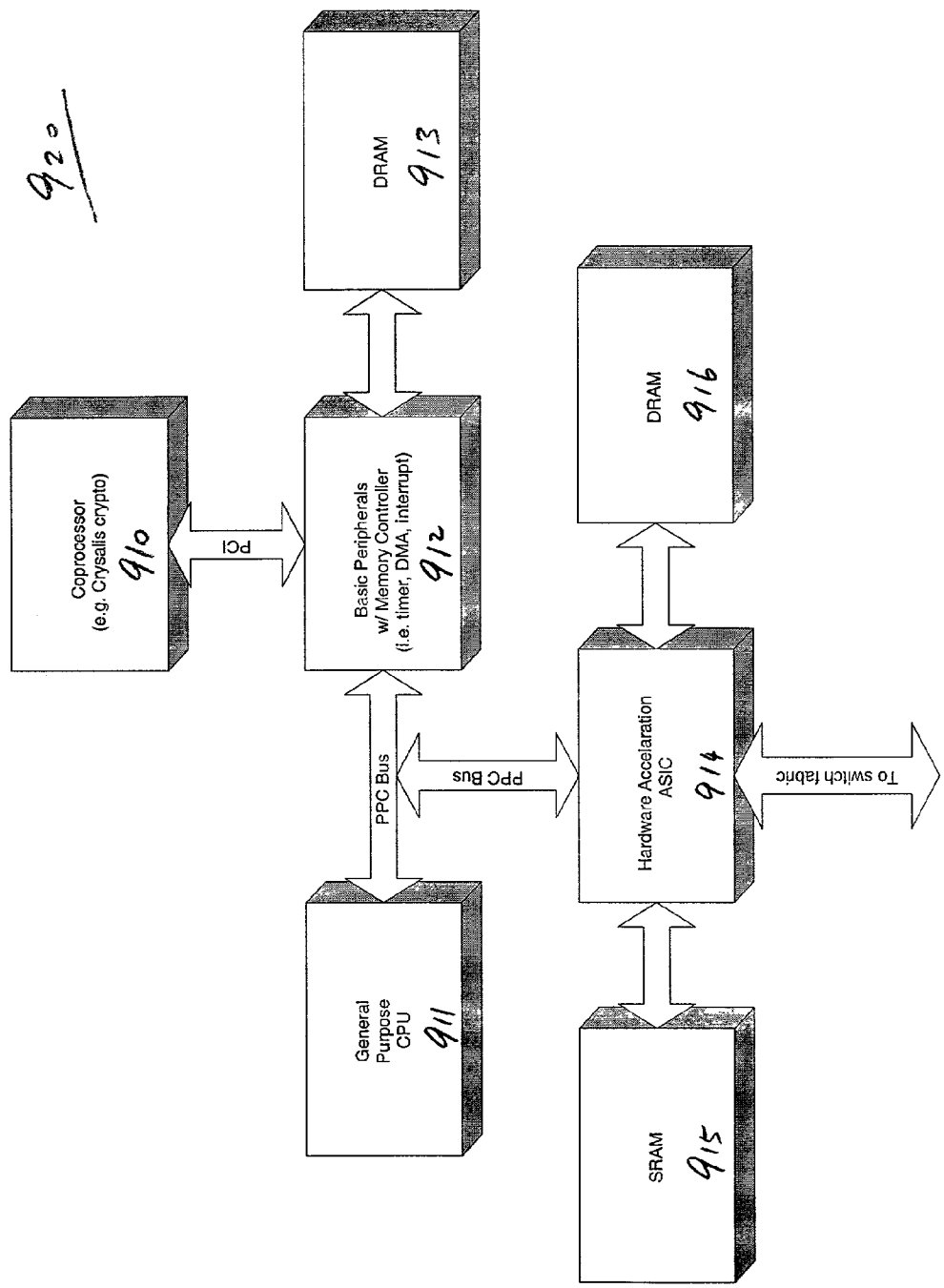
FIG. 9B shows a block diagram of an exemplary service processing module according to an alternative embodiment of the invention.

FIG. 9B shows an exemplary block diagram of an SPE, according to an alternative embodiment of the invention. The SPE includes a general purpose central processing unit (CPU) 911, basic peripherals 912 such as a north bridge (e.g., memory controller), a hardware acceleration device 914, optional coprocessor such as cryptographic device 910, and other memory such as static random access memory (SRAM) 915 and dynamic random access memory (DRAM) 913 and 916. In one embodiment, the general purpose CPU is a PowerPC processor, such as PPC 7400, from Motorola, Inc. Other CPU may be utilized. In one embodiment, the hardware acceleration device 914 may be implemented as an ASIC.

The GPC is responsible for receiving at least the first packet of a new flow and determining how the flow should be handled. Software running on the GPC determines which services should be applied to the new flow, and which, if any, fast-path operations should be used to handle further packets belonging to the flow.

The hardware acceleration device 914 contains the fabric interface, the fast-path packet processing, and the slow-path interface to the GPC. The fabric interface implements the segmentation and reassembly required to send packets across the cell-based switch fabric. The fast-path implements a set of primitives such as full and half network address translation (NAT), transmission control protocol (TCP) connection splicing, and internet protocol (IP) checksum recalculation, that are programmed for each flow that is placed on the fast-path. The slow-path interface is a PPC bus master that enables full access to the GPC DRAM. The hardware acceleration device also performs packet queuing per customer with token-based rate control. The GPC uses the switch fabric, such as switch fabric 203 of FIG. 2, and a message passing protocol to communicate with I/O Modules, Management Modules, and other SPEs.

Figure 9C:
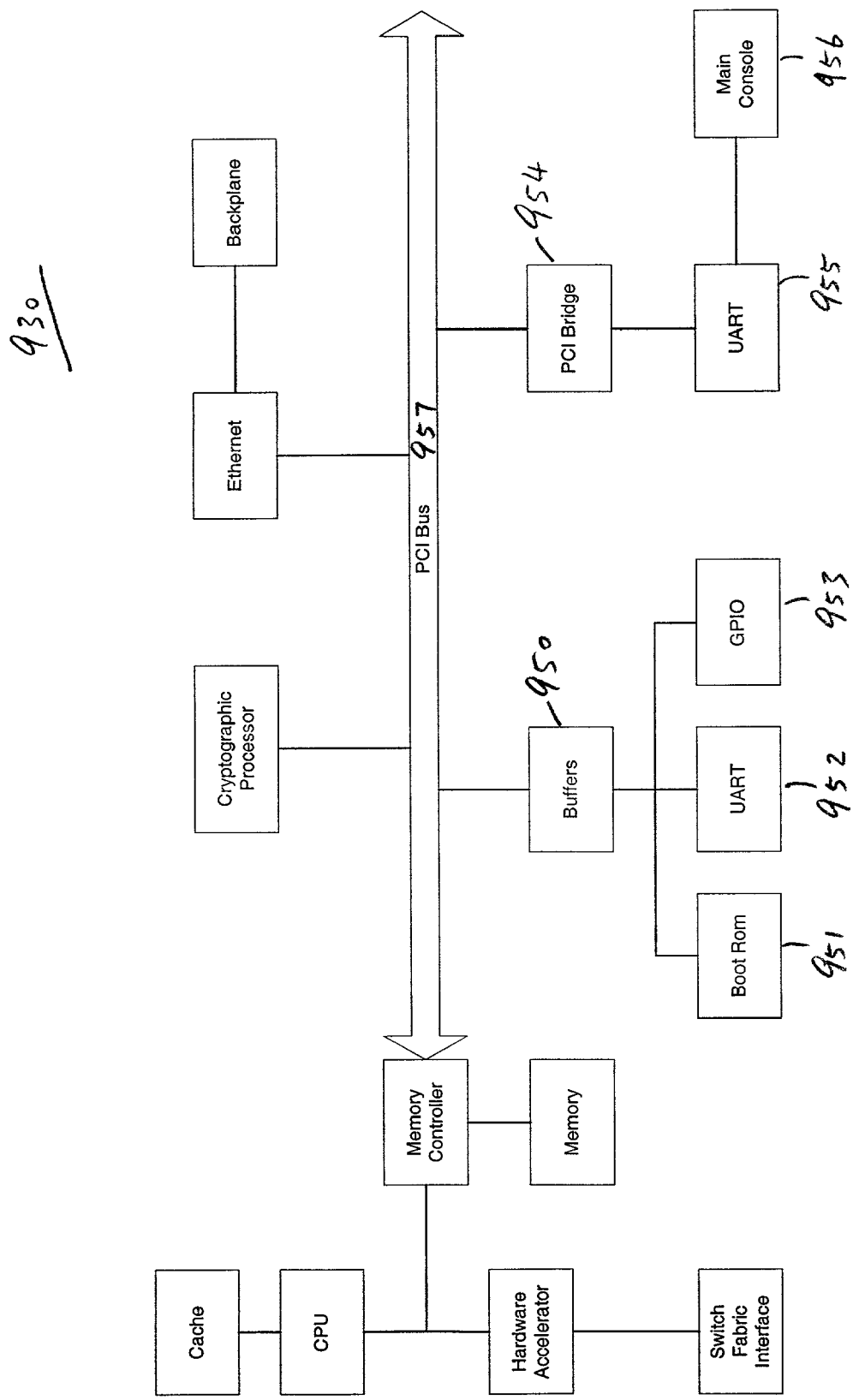
FIG. 9C shows a block diagram of an exemplary service processing module according to yet another alternative embodiment of the invention.

FIG. 9C shows an exemplary block diagram of an SPE, according to yet another alternative embodiment of the invention. In addition to the system 920 shown in FIG. 9B, the system 930 also includes buffers 950 coupled to the peripheral component interface (PCI) bus 957. The buffers 950 may be used by the boot read only memory (ROM) 951 for initialization, by a universal asynchronous receiver/transmitter (UART) 952 for debug purpose, or by a general purpose input/output (GPIO) 953. Furthermore, the SPE may include another UART 955 coupled to the PCI bus through the PCI bridge 954. The UART 955 provides data to a remote terminal such as main console 956.

In one embodiment, each flow of packets may include a sibling flow of response packets that flows in the opposite direction. These two flows are called the forward path and the reverse path. Whichever direction initiates the connection is called the forward path. The state information for these two flows is stored in a session context that is shared by the forward and reverse paths. The session context and flow entries (forward and reverse) are combined into a connection record. The flow entries are referenced directly within the flow lookup mechanism, but they are tied to the session context within the connection record.

Figure 10:
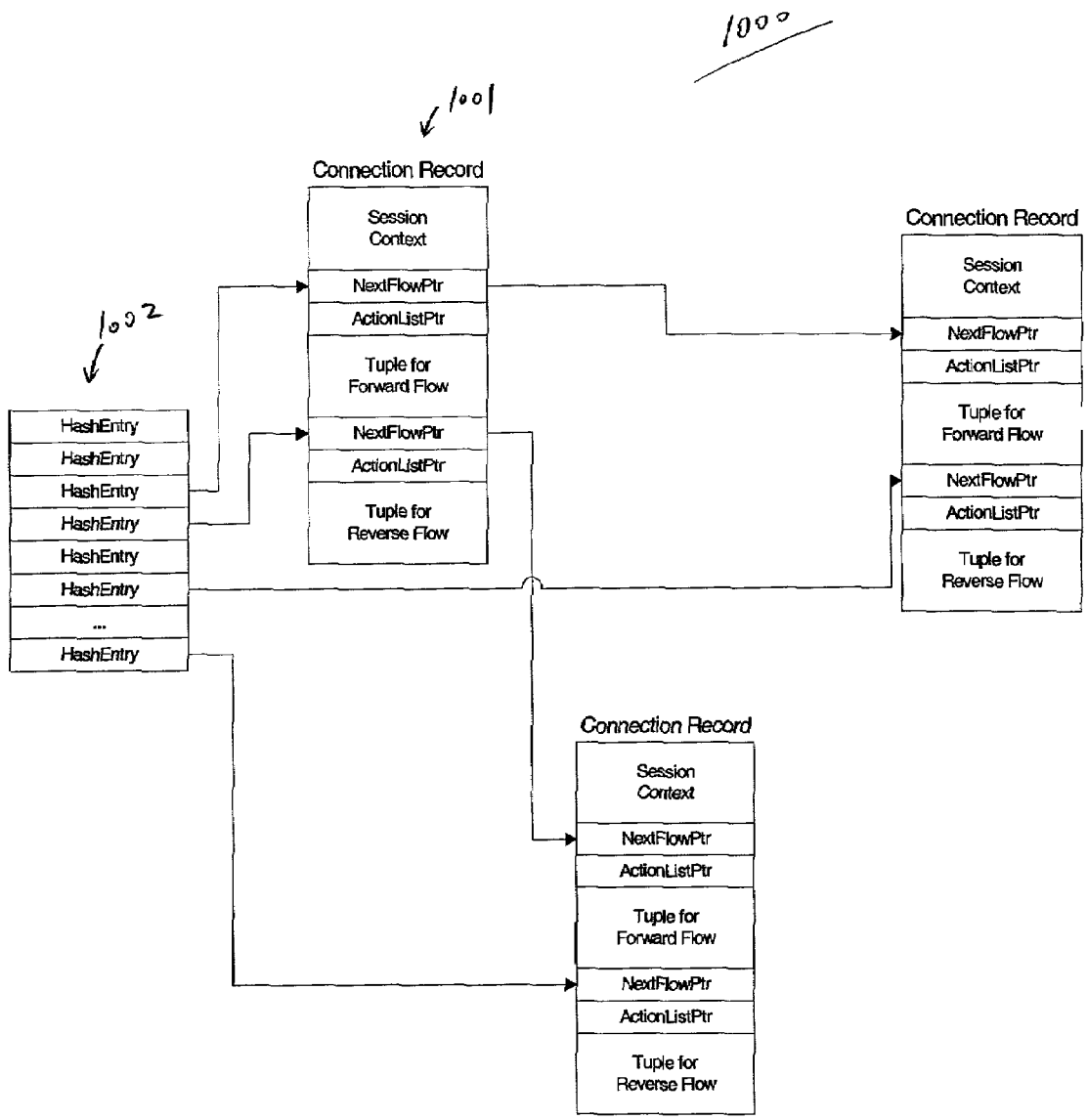
FIG. 10 shows an exemplary block diagram of a connection record according to one embodiment of the invention.

FIG. 10 shows an exemplary block diagram of a connection record according to one embodiment of the invention. The session context is referenced by the session number and contains statistical information for that session as well as some TCP state and other flags.

The hardware accelerator, such as hardware acceleration ASIC 914 of FIG. 9B, populates a message buffer in the GPC's DRAM for each message that is sent to the slow path. The slow path message buffer includes header lengths, processing flags, per flow statistics, and the message data. The session context 1001 stores the statistics, TCP ACK and FIN information, message timestamp, and various flags for the forward and reverse flows.

Following is an exemplary connection record in accordance with an embodiment of the invention:

| Session Context |
| --- |
| Forward Flow Table Entry |
| Reverse Flow Table Entry |

In one embodiment, the exemplary connection record includes a session context, a forward flow table entry, and a reverse flow table entry. The session context portion may have a size of 64 bytes. The forward flow table entry may have a size of 32 bytes. The reverse flow table entry may have a size of 32 bytes. Other size configurations may exist. The session context may include the flow information of the forward and reverse flows. In one embodiment, the session context may include TCP states of the flows. In one embodiment, the session context may include forward TCP state and reverse TCP state. Other information may be included in the session context. The forward and reverse flow table entry may be compatible with the flow table entry 412 of FIG. 4B.

It is important to note that the system maintains a single hash table, such as hash table 1002 of FIG. 10, to determine a forward or a reverse flow based on a single hash operation. A conventional method involves at least two look up to determine (e.g., one for forward and one for reverse flow) whether the flow is a forward flow or a reverse flow.

Figure 11:
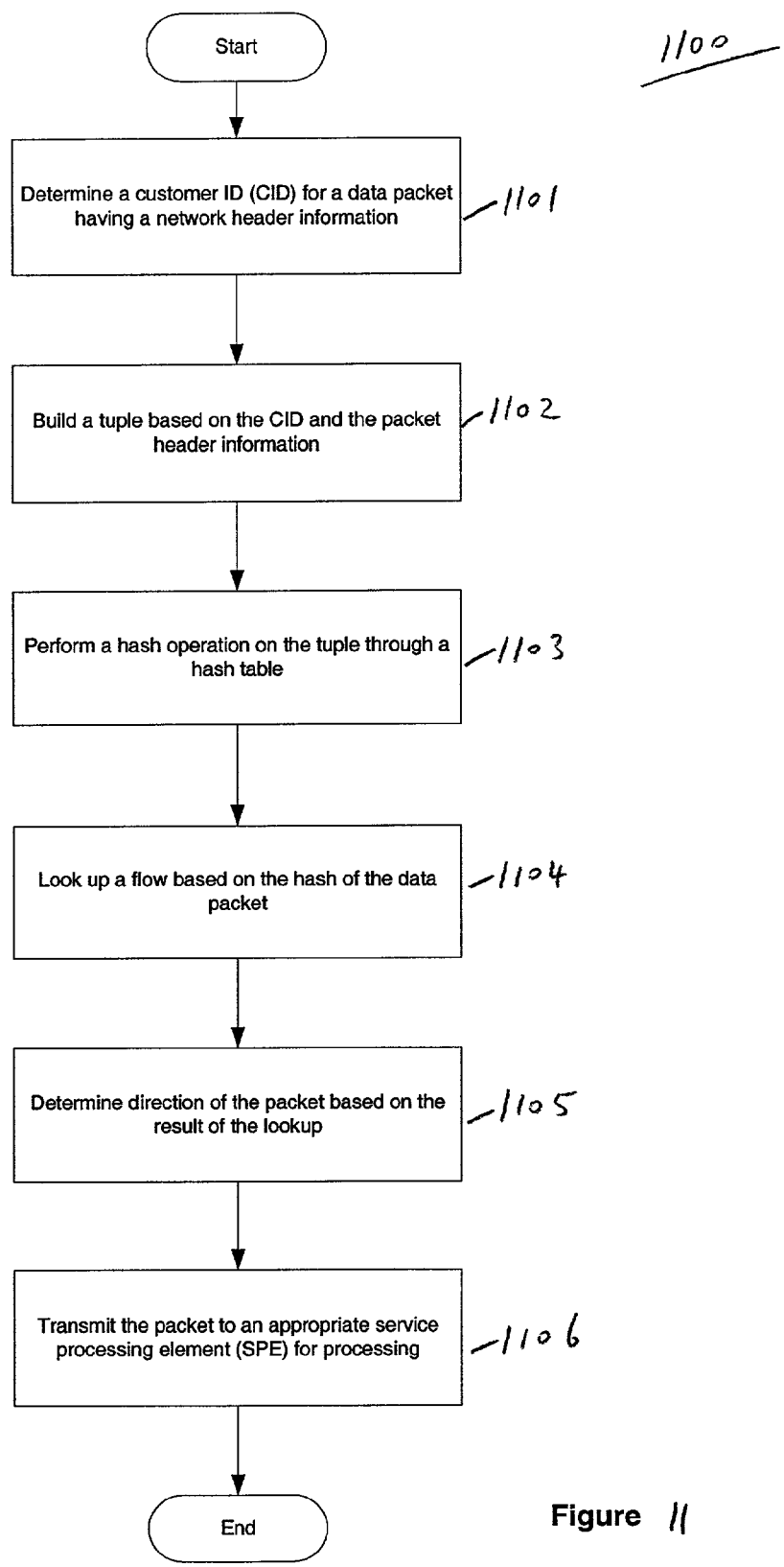
FIG. 11 shows an exemplary method for processing a data packet according to yet another alternative embodiment of the invention.

FIG. 11 shows a flowchart illustrating an exemplary method for processing a data flow according to one embodiment of the invention. In one embodiment, the method includes determining a flow type of the data packet, performing a hash operation on a hash table based on the network protocol information and the flow type, the hash operation being independent of the direction of the data packet, identifying a next flow based on a result of the hash operation, the result of the hash operation indicating the direction of the next flow, and transmitting the data packet to a service processing element corresponding to the next flow.

Referring to FIG. 11, when a data packet is received, at block 1101, the system determines a customer ID (e.g., local domain ID) based on the network protocol information (e.g., layer 1 to layer 7 of the network protocol layers shown in FIG. 1B). In one embodiment, the method to determined a customer ID used is based on the method shown in FIG. 8A. At block 1102, a tuple is built based on the customer ID (CID) and its network protocol header information. At block 1103, the system (e.g., an SPE) then performs a single hash operation on a hash table, such as hash table 1002 of FIG. 10. At block 1104, the system looks up a flow based on the hash of the data packet. At block 1105, the system determines whether the data packet belongs to a forward or reverse flow based on the result of the lookup.

At blocks 1104 and 1105, the system looks up the corresponding flow based on the result of the hash operation. The result of the hash operation produces an offset pointing to a location of a connection record 1001, upon which the direction of the flow is determined. Once the flow is determined, at block 1106, the system transmits the data packet to an appropriate SPE identified by the flow.

Figure 12A:
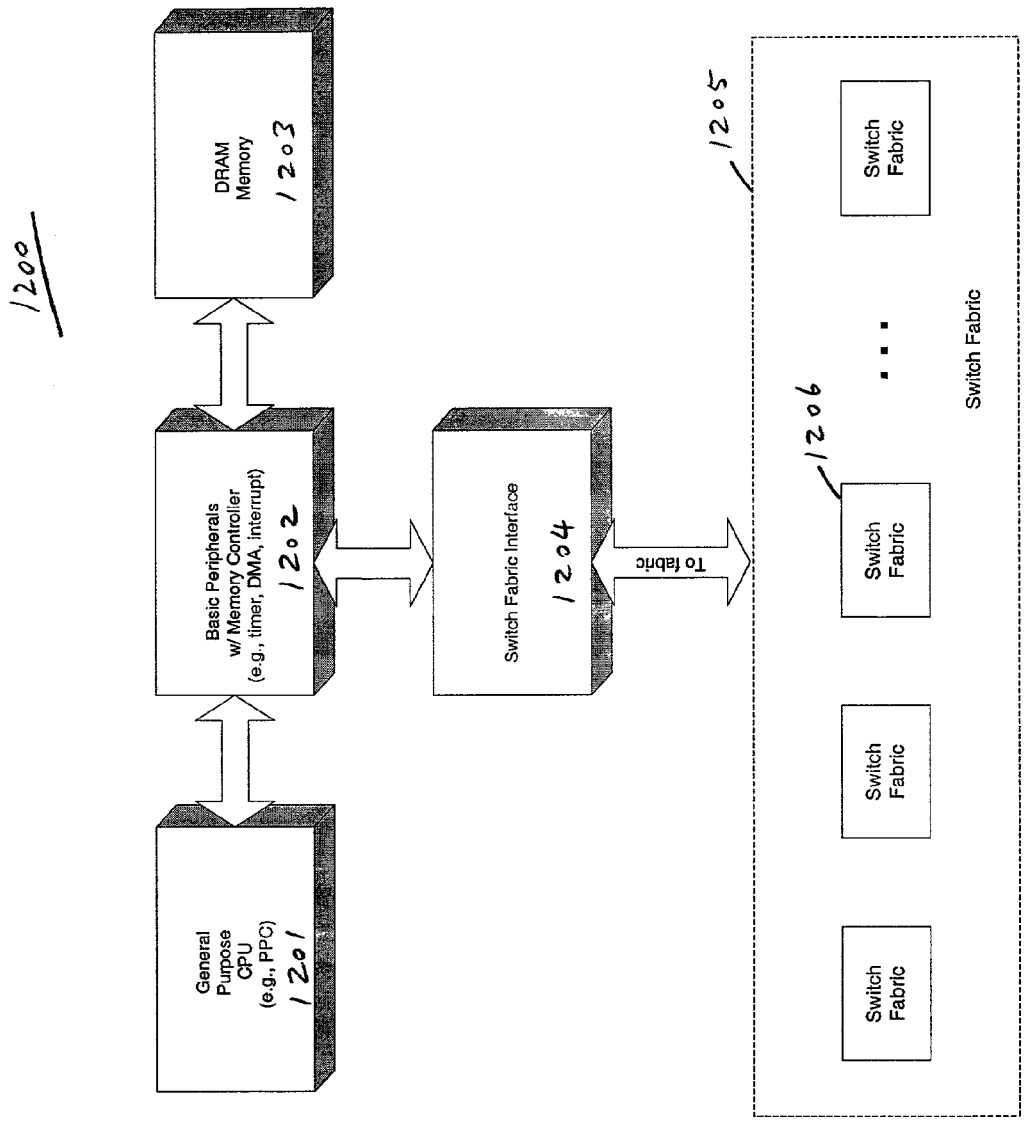
FIG. 12A shows a block diagram of an exemplary management module according to one embodiment of the invention.

FIG. 12A shows a simplified block diagram of an exemplary management module according to one embodiment of the invention. In one embodiment, the management module 600 includes a general purpose CPU 1201, basic peripherals 1202 including memory controller, timer, direct memory access (DMA), and interrupt, DRAM 1203, and a switch fabric interface 1204. The management module is coupled to the switch fabric 1205 through the switch fabric interface 1204. In one embodiment, the management module 1200 and the switch fabric 1205 may be placed in the same physical board.

The Management Module 1200 is responsible for overall system management processing. When an outside entity is "talking to the box," it's talking to the Management Module. The Management Module has the system IP protocol stack and the system IP address. The Management Module runs protocol modules such as simple network management protocol (SNMP) and hypertext transfer protocol (HTTP)

that communication with other modules in the box to provide a complete system view for management applications.

The Management Module is a simple processor-memory subsystem. It connects to other modules in the system via the fabric 1205 and the out-of-band connection. The management module also receives hardware interrupts whenever another card is inserted or removed from the system. This hardware notification is used to drive all reconfiguration events in the system, including dynamically changes of the functionality of a topology, or dynamic software upgrade (e.g., on-the-fly), which will be described in details further below. The Management Module is a centralized resource in the system and therefore has a hot-standby redundant module, such as standby management module 204 of FIG. 2. The active module (e.g., active management module 202 of FIG. 2), and the redundant module continuously monitor each other to determine whether the peer is present in the system and functioning normally. If any abnormalities are detected in the active management module 202 by the standby module 204, the standby module 204 takes control of the system and becomes the active module.

Figure 12B:
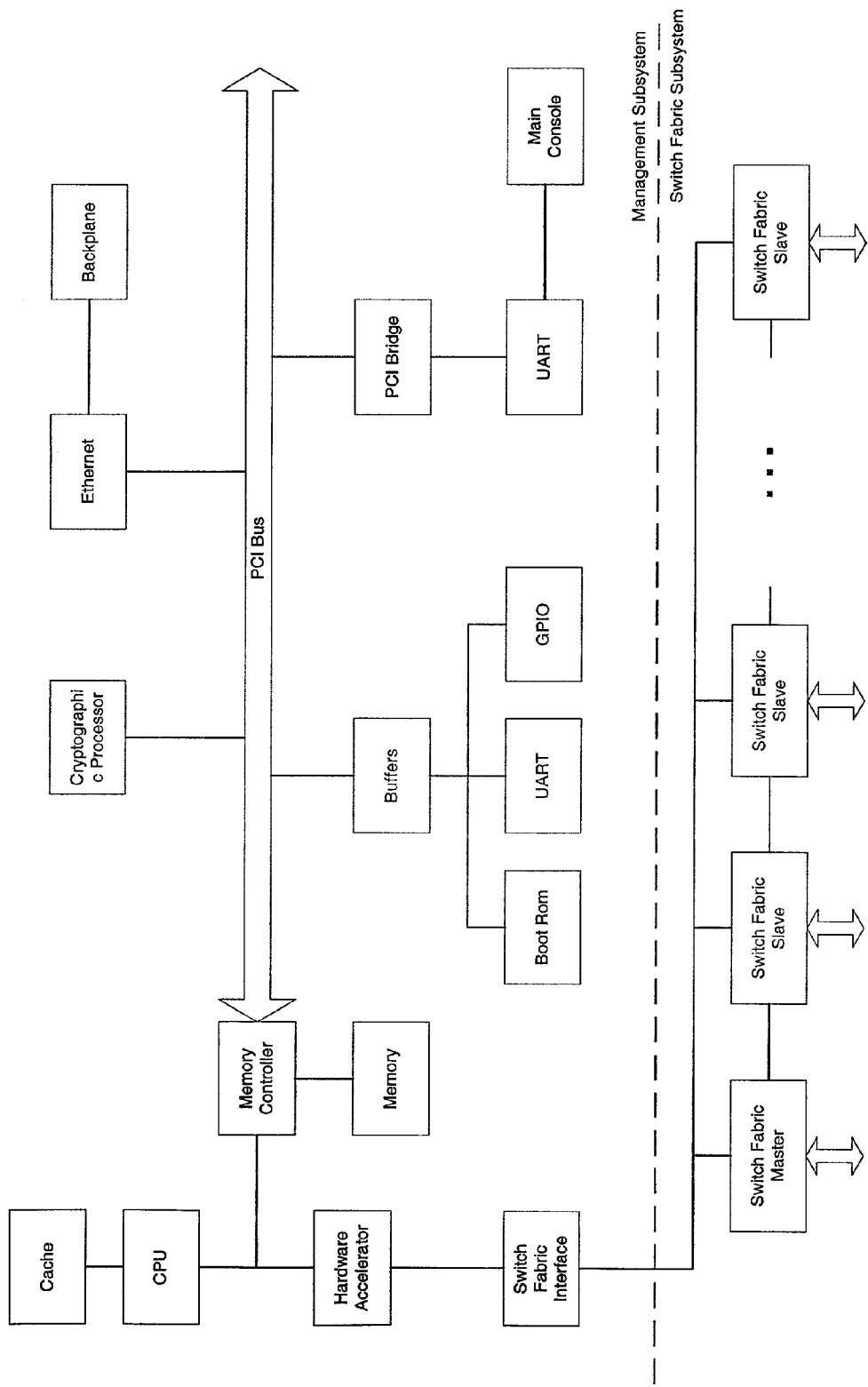
FIG. 12B shows a block diagram of an exemplary management module according to an alternative embodiment of the invention.

The switch fabric module 1205 controls all data switching in the system. Its main purpose is to house the fabric silicon implementation (e.g., fabric 1206). The system contains one or more switch fabric modules. The switch fabric is connected to other modules in the system through the system backplane. In one embodiment, there is at least one connection to each of the other modules in the system. Alternatively, there may be more than one depending on how the switch fabric is configured and the bandwidth needs of the other modules. The switch fabric module also connects to the system bus. Through the system bus, the management module and other processing modules can alter the behavior of the switch fabric. During most system operation, there is not much need to reconfigure the switch fabric. The switch fabric itself is implemented using an off-the-shelf fabric from a standard silicon supplier, which is well known in the art. Typical off-the-shelf fabrics implement either shared-memory or crossbar architecture. FIG. 12B depicts yet another simplified block diagram of a management module according to an alternative embodiment of the invention.

It will be appreciated that that more or fewer processes may be incorporated into the methods illustrated in the Figures without departing from the scope of the invention and that no particular order is implied by the arrangement of blocks shown and described herein. It further will be appreciated that the processes described in conjunction with Figures may be embodied in machine-executable instructions, e.g. software. The instructions can be used to cause a general-purpose or special-purpose processor that is programmed with the instructions to perform the operations described. Alternatively, the operations might be performed by specific hardware components that contain hardwired logic for performing the operations, or by any combination of programmed computer components and custom hardware components.

The methods may be provided as a computer program product that may include a machine-readable medium having stored thereon instructions which may be used to program a computer (or other electronic devices) to perform the methods. For the purposes of this specification, the terms "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for processing a data packet received at an interface of a network equipment over a network, the method comprising:
   extracting network protocol information associated with multiple different network protocol layers from the data packet;
   determining a local domain ID based on the extracted network protocol information associated with the multiple different network protocol layers, the local domain ID being uniquely assigned to a customer;
   assigning the local domain ID to the data packet and to a flow of data packets arriving at the interface to which the data packet belongs; and
   internally routing the data packet and each subsequently received data packet belonging to the flow from a first module of the network equipment to a second module of the network equipment based on the local domain ID assigned to the flow.

2. The method of claim 1, wherein the network protocol information associated with multiple different network protocol layers comprises:
   port information;
   a virtual local area network (VLAN) ID;
   a destination internet protocol (IP) address;
   a source IP address; and
   a media access control (MAC) address.

3. The method of claim 1, further comprising:
   determining whether the interface is shared by multiple local domains for external routing; and
   determining the local domain ID based on the interface, VLAN ID, MAC address, and destination IP address extracted from a header of the data packet, if the interface is shared by multiple local domains for external routing.

4. The method of claim 1, further comprising:
   determining whether the interface is shared by multiple local domains for internal routing; and
   determining the local domain ID based on the interface, VLAN ID, MAC address, and destination IP address extracted from a header of the data packet, if the interface is shared by multiple local domains for external routing.

5. A method for processing a data packet received at an interface of a network equipment through a network, the data packet having network protocol information, the method comprising:
   determining a flow type of the data packet;
   determining a local domain ID for the data packet using network protocol information associated with multiple different network protocol layers, the local domain ID being uniquely assigned to a customer;

selecting a service processing element (SPE) from among a plurality of SPEs within the network equipment to process the data packet, the selecting of the SPE being based on the flow type and the local domain ID of the data packet; and transmitting the data packet, internally within the network equipment, from the interface to the selected SPE.

6. The method of claim 5, wherein the network protocol information associated with multiple different network protocol layers comprises:

port information;

a virtual local area network (VLAN) ID;

a destination internet protocol (IP) address;

a source IP address; and a media access control (MAC) address.

7. The method of claim 5, further comprising:

determining whether the interface is shared by multiple local domains for external routing; and determining the local domain ID based on the interface, VLAN ID, MAC address, and destination IP address extracted from a header of the data packet, if the interface is shared by multiple local domains for external routing.

8. The method of claim 5, further comprising:

determining whether the interface is shared by multiple local domains for internal routing; and determining the local domain ID based on the interface, VLAN ID, MAC address, and destination IP address extracted from a header of the data packet, if the interface is shared by multiple local domains for internal routing.

9. The method of claim 5, wherein the selecting of the SPE comprises:

performing a hash operation based on the network protocol information and the flow type of the data packet; and selecting the SPE based on a result of the hash operation.

10. The method of claim 5, further comprising:

searching a flow table to identify a flow in which the data packet belongs;

retrieving the local domain ID from the flow table if the flow is identified.

11. The method of claim 10, further comprising:

building a tuple based on the network protocol information extracted from the data packet; and searching the flow table based on the tuple.

12. The method of claim 10, further comprising:

building a message header based on the information retrieved from the flow table or based on the SPE selection;

appending the message header to the data packet; and transmitting the data packet based on the message header.

13. A machine-readable storage medium having stored thereon executable code to cause a machine to perform a method for processing a data packet received at an interface of a network equipment over a network, the method comprising:

extracting network protocol information associated with multiple different network protocol layers from the data packet;

determining a local domain ID based on the extracted network protocol information associated with the multiple different network protocol layers, the local domain ID being uniquely assigned to a customer;

assigning the local domain ID to the data packet and to a flow of data packets arriving at the interface to which the data packet belongs, the local domain ID assigned to the flow being used to internally route the data packet and each subsequently received data packet belonging to the flow from a first module of the network equipment to a second module of the network equipment.

14. The machine-readable storage medium of claim 13, wherein the network protocol information associated with multiple different network protocol layers comprises:

port information;

a virtual local area network (VLAN) ID;

a destination internet protocol (IP) address;

a source IP address; and a media access control (MAC) address.

15. The machine-readable storage medium of claim 13, wherein the method further comprises:

determining whether the interface is shared by multiple local domains for external routing; and determining the local domain ID based on the interface, VLAN ID, MAC address, and destination IP address extracted from a header of the data packet, if the interface is shared by multiple local domains for external routing.

16. The machine-readable storage medium of claim 13, wherein the method further comprises:

determining whether the interface is shared by multiple local domains for internal routing; and determining the local domain ID based on the interface, VLAN ID, MAC address, and destination IP address extracted from a header of the data packet, if the interface is shared by multiple local domains for internal routing.

17. A machine-readable storage medium having stored thereon executable code to cause a machine to perform a method for processing a data packet received at an interface of a network equipment through a network, the data packet having network protocol information, the method comprising:

determining a flow type of the data packet;

determining a local domain ID for the data packet using network protocol information associated with multiple different network protocol layers, the local domain ID being uniquely assigned to a customer;

selecting a service processing element (SPE) from among a plurality of SPEs within the network equipment to process the data packet, the selecting of the SPE being based on the flow type and the local domain ID of the data packet; and transmitting the data packet, internally within the network equipment, from the interface to the selected SPE.

18. The machine-readable storage medium of claim 17 wherein the method further comprises:

performing a hash operation based on the network protocol information and the flow type of the data packet; and selecting the SPE based on a result of the hash operation.

* * * * *